(12) United States Patent
Miyazaki et al.

(10) Patent No.: US 7,352,502 B2
(45) Date of Patent: Apr. 1, 2008

(54) ELECTROPHORETIC PARTICLE, PROCESS FOR ITS PRODUCTION, AND ITS USE

(75) Inventors: Atsushi Miyazaki, Fujimi-machi (JP); Toshifumi Nishida, Osaka (JP); Mitsuo Kushino, Inagawa-cho (JP); Teruo Kikuta, Nagaokakyo (JP)

(73) Assignees: Nippon Shokubai Co., Ltd., Osaka (JP); Seiko Epson Corporation, Tokyo (JP)

( * ) Notice: Subject to any disclaimer, the term of this patent is extended or adjusted under 35 U.S.C. 154(b) by 419 days.

(21) Appl. No.: 11/142,403

(22) Filed: Jun. 2, 2005

(65) Prior Publication Data

US 2005/0270628 A1    Dec. 8, 2005

(30) Foreign Application Priority Data

Jun. 2, 2004  (JP) ............................ 2004-164962
May 26, 2005 (JP) ............................ 2005-153510

(51) Int. Cl.
*G02B 26/00* (2006.01)
*G09G 3/34* (2006.01)
*G03G 17/04* (2006.01)
*G03G 9/00* (2006.01)
*B05D 7/00* (2006.01)

(52) U.S. Cl. ............... 359/296; 359/452; 345/107; 430/32; 430/114; 347/100; 524/430; 524/497; 427/212; 428/402.2; 428/403; 523/216

(58) Field of Classification Search ............... 359/296, 359/452; 345/55, 107, 493, 48, 204; 430/32, 430/114, 115, 137.19; 427/212, 301; 428/402.2, 428/403; 347/95, 100, 101, 105; 524/425, 524/430, 497; 349/113; 424/46, 490; 204/600, 204/495, 507; 523/216; 205/201
See application file for complete search history.

(56) References Cited

U.S. PATENT DOCUMENTS

| 3,554,946 | A | * | 1/1971 | A .............................. 430/114 |
| 3,816,169 | A | * | 6/1974 | Vassiliades et al. ...... 428/313.5 |
| 3,930,101 | A | * | 12/1975 | Vincent ...................... 428/326 |
| 4,695,524 | A | * | 9/1987 | Knapp et al. ................. 430/32 |
| 5,100,471 | A | * | 3/1992 | Winnik et al. ............... 523/216 |
| 6,323,989 | B1 | * | 11/2001 | Jacobson et al. ........... 359/296 |
| 6,619,791 | B2 | * | 9/2003 | Tochihara et al. .......... 347/100 |

(Continued)

FOREIGN PATENT DOCUMENTS

JP      50-15115      6/1975

(Continued)

*Primary Examiner*—Loha Ben
(74) *Attorney, Agent, or Firm*—Wenderoth, Lind & Ponack, L.L.P.

(57) ABSTRACT

An electrophoretic particle including: a pigment particle having an average particle diameter of 1 µm or smaller; and a polymer layer having an average thickness of 1 to 500 nm formed on a surface of the pigment particle, wherein 50% or higher of an entire surface of the pigment particle is coated with the polymer layer. The electrophoretic particle can be produced by radical polymerization using a polymerization initiator in a state where a pigment particle and monomer components are present in a solvent. The electrophoretic particle can be used in a microcapsule and a sheet for electrophoretic display, as well as an electrophoretic display device and an electronic equipment.

7 Claims, 5 Drawing Sheets

U.S. PATENT DOCUMENTS

| | | | |
|---|---|---|---|
| 6,623,557 B2 * | 9/2003 | Hayashi et al. | 106/499 |
| 6,666,914 B2 * | 12/2003 | Hayashi et al. | 106/499 |
| 6,721,083 B2 * | 4/2004 | Jacobson et al. | 359/296 |
| 6,882,463 B2 * | 4/2005 | Motoi et al. | 359/296 |
| 6,956,690 B2 * | 10/2005 | Yu et al. | 359/296 |
| 7,002,728 B2 * | 2/2006 | Pullen et al. | 359/296 |
| 7,008,744 B2 * | 3/2006 | Horie et al. | 430/114 |
| 7,022,752 B2 * | 4/2006 | Hayashi et al. | 523/210 |
| 7,081,488 B2 * | 7/2006 | Bardman et al. | 523/200 |
| 7,147,915 B2 * | 12/2006 | Kawai et al. | 428/402.2 |
| 2004/0218252 A1 * | 11/2004 | Motoi et al. | 359/296 |

FOREIGN PATENT DOCUMENTS

| | | |
|---|---|---|
| JP | 64-86116 | 3/1989 |

\* cited by examiner

ELECTROPHORETIC PARTICLE, PROCESS FOR ITS PRODUCTION, AND ITS USE

BACKGROUND OF THE INVETION

1. Field of the Invention

The present invention relates to an electrophoretic particle, a process for its production, and its use.

2. Description of the Related Art

There is a phenomenon called electrophoresis, in which charged particles dispersed in a liquid migrate in the liquid in response to an external electric field, and much attention has been paid to display devices making use of this phenomenon, referred to as "electrophoretic display devices." The electrophoretic display devices fall under the category of the non-light emitting display devices, and have many excellent properties such as extremely lower power consumption, a higher level of visibility (wider viewing angle), and capability of recording displayed contents for a long term without consuming electricity, when compared with liquid crystal displays.

For example, Japanese Patent Publication No. 50-15115 discloses a cell-type electrophoretic display device in which a dispersion containing at least two kinds of electrophoretic particles having difficult optical reflection properties and different charge polarities is interposed between a pair of transparent substrates each having a surface on which a transparent electrically conductive film is formed. This electrophoretic display device is such that these particles are allowed to cause electrophoretic migration by the application of a prescribed voltage between the transparent electrically conductive films to optically hide one kind of particles from the other kind of particles, and utilize a consequent change in optical reflection properties of the dispersion for displaying or recording character data or image data.

The cell-type electrophoretic display device, however, has a serious problem that electrophoretic particles may unevenly be distributed to cause a deterioration in display quality. Thus, there has been proposed a method of disposing porous spacers between the transparent substrates and injecting a dispersion into voids formed by the spacers. This method, however, has a serious problem that it may be quite difficult to evenly inject a dispersion into a great number of voids and, in the case of a dispersion using a volatile dispersing medium, the properties of the dispersion may be changed during injection work, it may be difficult to ensure uniform display quality.

For solving the above problems of the cell-type electrophoretic display, for example, Japanese Patent Application Publication No. 64-86116 discloses a microcapsule-type electrophoretic display device in which many microcapsules are disposed between a pair of electrode plates, at least one of which is transparent, each microcapsule encapsulating a dispersion containing electrophoretic particles in a dispersing medium colored with a dye, these electrophoretic particles having an optical property different from that of the dispersing medium. This electrophoretic display device is such that the encapsulation of a dispersion containing electrophoretic particles in many microcapsules prevents uneven distribution of the electrophoretic particles, and has greatly improved display properties such as display responsiveness, display stability, contrast, and rewritable times of display, when compared with the cell-type electrophoretic display device.

In recent years, the electrophoretic display devices have drawn much attention to themselves, in addition to their excellent display properties, because they can be applied to flexible display devices which are thin and can freely be bent like a paper or display devices which can easily be produced to have a great surface area at a low cost. Further technical development has been proposed in the field of "digital paper (electronic paper)" such as paper-like display and rewritable paper, and applications have been tried in the display on IC cards and IC tags, as well as electronic white boards, direction boards, advertisement boards, electronic newspapers, electronic books, and mobile terminals (e.g., PDAs).

However, the conventional electrophoretic display devices have not yet had sufficiently satisfactory display properties when compared with the required level of performance both at the present time and in the future, and for application to various display devices as described above, in particular, it has been necessary to further improve display properties such as display responsiveness and contrast.

SUMMARY OF THE INVENTION

Under these circumstances, it is an object of the present invention to provide an electrophoretic particle, which can give electrophoretic display devices having extremely excellent display properties such as display responsiveness and contrast, a process for its production, and its use thereof, more particularly, a microcapsule and sheet for electrophoretic display, as well as an electrophoretic display device and an electronic equipment.

In order to attain the above object, the present inventors have intensively studied and, as a result, they have found that regarding an electrophoretic particle comprising a pigment particle and a polymer layer formed on a surface of the pigment particle, when an average particle diameter of the pigment particle, an average thickness of the polymer layer, and a coating ratio of the polymer layer to an entire surface of the pigment particle are adjusted in their prescribed ranges, an electrophoretic display device having extremely excellent display properties such as display responsiveness and contrast can be obtained, and that for producing an electrophoretic particle using a dispersion polymerization method, when procedures and conditions are appropriately selected, the above electrophoretic particle can be obtained extremely effectively, thereby completing the present invention.

Thus, the present invention provides an electrophoretic particle comprising: a pigment particle having an average particle diameter of 1 µm or smaller; and a polymer layer having an average thickness of 1 to 500 nm formed on a surface of the pigment particle, wherein 50% or higher of an entire surface of the pigment particle is coated with the polymer layer.

The present invention further provides a process for producing an electrophoretic particle, comprising steps of: carrying out radical polymerization using a polymerization initiator in a state where a pigment particle and monomer components are present in a solvent to give an electrophoretic particle comprising a pigment particle and a polymer layer formed on a surface of the pigment particle, wherein: the pigment particle is a pigment particle having an average particle diameter of 1 µm or smaller which has been mixed with a coupling agent having a polymerizable reactive group prior to the radical polymerization; an amount of the coupling agent having a polymerizable reactive group to be used is 0.1% to 5% by weight, based on an amount of the pigment particle to be used; the solvent comprises a hydrophilic organic solvent and water, and a ratio of the water to be added is 10% to 30% by weight, based on a total amount of the solvent; the monomer components comprise a hydrophilic monomer and a hydrophobic monomer, and a ratio of the hydrophilic monomer to be added is 5% to 30% by weight, based on a total amount of the monomer components; and the polymerization initiator is water soluble, and a concentration of the monomer components is 0.5% to 5% by weight, based on a total amount of the solvent and the monomer components.

The present invention further provides a dispersion for electrophoretic display, comprising a dispersing medium and the above electrophoretic particle dispersed in the dispersing medium.

The present invention further provides a microcapsule for electrophoretic display, comprising a capsule shell and the above dispersion for electrophoretic display encapsulated in the capsule shell.

The present invention further provides a sheet for electrophoretic display, comprising: a substrate sheet having a substrate film and an electrically conductive layer formed on the substrate film; and a layer containing the above microcapsules for electrophoretic display, the microcapsules-containing layer being formed on the electrically conductive layer of the substrate sheet.

The present invention further provides an electrophoretic display device comprising a data displaying part, wherein the data displaying part comprises the above sheet for electrophoretic display.

The present invention further provides an electronic equipment comprising a data displaying means, wherein the data displaying means comprises the above electrophoretic display device.

The electrophoretic particle of the present invention provides a dispersing system having a high zeta potential and has extremely high dispersibility in a dispersing medium. Therefore, the electrophoretic particle of the present invention, as well as the microcapsule and sheet for electrophoretic display according to the present invention using the same, make it possible to obtain an electrophoretic display device and an electronic equipment having extremely excellent display properties such as display responsiveness and contrast. In addition, the process for producing an electrophoretic particle according to the present invention makes it possible that, in the production of an electrophoretic particle having a polymer layer on a surface of a pigment particle, sufficiently high levels can be attained in both of a polymerization rate of all monomer components and a polymerization rate of a polymer corresponding to the polymer layer coating the surface of the pigment particle.

DETAILED DESCRIPTION OF THE PREFERED EMBODIMENTS

Figure 1:
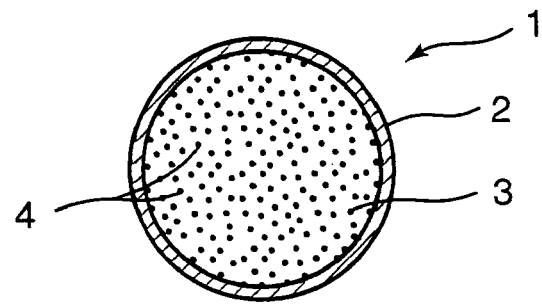
FIG. 1 is a schematic cross-sectional view showing one example of the microcapsule for electrophoretic display according to the present invention.

The electrophoretic particle of the present invention, a process for its production, and its use according to the present invention will be described below in detail and in specific terms; however, the scope of the present invention is not limited to these descriptions. The present invention can also be practiced after appropriate alteration or modification in such a range that the gist of the present invention is not deviated, regarding embodiments other than described below, and all of them are included in the scope of the present invention.

<<Electrophoretic Particle>>

The electrophoretic particle of the present invention comprises a pigment particle having an average particle diameter of 1 µm or smaller and a polymer layer having an average thickness of 1 to 500 nm formed on the surface of the pigment particle, wherein 50% or higher of the entire surface of the pigment particle is coated with the polymer layer.

As used herein, the term "electrophoretic particle" refers to a solid particle having electrophoretic properties in a dispersion, that is, a solid particle having a positive or negative charge in a dispersion and capable of substantially moving in the dispersion in response to an external electric field.

Examples of the pigment particle forming an electrophoretic particle may include particles made of inorganic pigments such as titanium oxide, barium sulfate, zinc oxide, and Chinese white as the white color series; inorganic pigments such as yellow iron oxide, cadmium yellow, titanium yellow, and chrome yellow, and organic pigments including insoluble azo compounds such as fast yellow, fused azo compounds such as chromophthal yellow, azo complex salts such as benzimidazolone azo yellow, fused polycycles such as flavans yellow, hanza yellow, naphthol yellow, nitro compounds, and pigment yellow as the yellow color series; inorganic pigments such as molybdate orange, and organic pigments including azo complex salts such as benzimidazolone azo orange, and fused polycycles such as perynone orange as the orange color series; inorganic pigments such as Indian red and cadmium red, and organic pigments including color lakes such as mada lake, soluble azo compounds such as lake red, insoluble azo compounds such as naphthol red, fused azo compounds such as chromophthal scarlet, fused polycycles such as thioindigo Bordeaux, quinacridone pigments such as Cinquacia red Y and hostarparm red, and azo pigments such as permanent red and fast slow red as the red color series; inorganic pigments such as manganese violet, and organic pigments including color lakes such as Rhodamine lake, and fused polycycles such as dioxazine violet as the violet color series; inorganic pigments such as Prussian blue, ultramarine, cobalt blue, and cerulean blue, and organic pigments including phthalocyanines such as phthalocyanine blue, indanthrenes such as indanthrene blue, and alkali blue as the blue color series; inorganic pigments such as emerald green, chrome green, chromium oxide, and viridian, and organic pigments including azo complex salts such as nickel azo yellow, nitroso compounds such as pigment green, and naphthol green, and phthalocyanines such as phthalocyanine green as the green color series; inorganic pigments such as carbon black, titanium black, and iron black, and organic pigments such as aniline black as the black color series. These pigment particles may be used alone, or two or more kinds of them may be used in combination. In these pigment particles, preferred are pigment particles of the white color series, such as titanium oxide, and pigment particles of the black color series, such as carbon black and titanium black.

When titanium oxide is used, although the kind of titanium oxide is not particularly limited, titanium oxide of any type may be used, so far as it is widely used as a white color series pigment. For example, titanium oxide of either the rutile type or the anatase type may be used and, taking into consideration the color fading of a coloring agent due to photocatalyst activity, preferred is titanium oxide of the rutile type having lower photocatalyst activity. In order to further reduce photocatalyst activity, more preferred is titanium oxide which has been subjected to Si treatment, Al treatment, Si—Al treatment, or Zn—Al treatment.

When a pigment particle has no or insufficient electrophoretic properties, the pigment particle may be provided, if necessary, with sufficient electrophoretic properties by any of the known methods such as treatment with a coupling agent having an electrifiable group.

In the electrophoretic particles of the present invention, the average particle diameter of pigment particles is 1 µm or smaller as expressed in volume average particle diameter. When the average particle diameter of pigment particles is too small, the electrophoretic particles cannot have a sufficient degree of chroma, and when used in an electrophoretic display device, contrast may be reduced, so that display may become unclear. In contrast, when the average particle diameter of pigment particles is too great, it may be necessary to raise the coloring degree of the particles themselves more than as needed, the amount of pigments to be used may be increased, the rapid movement of the electrophoretic particles may become difficult at a part to which a voltage is applied for displaying, and their speed of response (display responsiveness) may be decreased. For this reason, the average particle diameter of pigment particles may preferably have a lower limit of 0.05 µm, more preferably 0.1 µm, and an upper limit of 0.8 µm, more preferably 0.6 µm.

Examples of the polymer forming the polymer layer may include polyolefin polymers, poly(halogenated olefin) polymers, polyester polymers, polyurethane polymers, polystyrene polymers, acrylic polymers, epoxy polymers, melamine polymers, and urea polymers. As used herein, the term "polymer" includes a homopolymer and a copolymer obtained by copolymerization of a monomer(s) with a small amount of a copolymerizable monomer(s). These polymers may be used alone, or two or more kinds of them may be used in combination. In these polymers, preferred are polystyrene polymers, acrylic polymers, and epoxy polymers, and more preferred are polymers having a structure unit derived from such a hydrophilic monomer and such a hydrophobic monomer as listed below in the description of a process for producing an electrophoretic particle.

In the electrophoretic particle of the present invention, the pigment particle has a polymer layer having the average thickness of 1 to 500 nm on the surface thereof. As used herein, the polymer layer having the "average thickness of 1 to 500 nm" means that the average value of thickness as measured at five parts chosen at random in the polymer layer is in the range of 1 to 500 nm. The average thickness of a polymer layer may preferably have a lower limit of 2 nm and an upper limit of 300 nm, more preferably 200 nm. When the polymer layer has the average thickness of smaller than 1 nm, the effect of coating with a polymer cannot sufficiently be exhibited, so that the dispersibility of electrophoretic particles in a dispersing medium may be reduced, and when the resulting electrophoretic particles are used in an electrophoretic display device, display properties such as display stability and contrast may be reduced, or display properties under a high humidity may be deteriorated. In contrast, when the polymer layer has the average thickness of greater than 500 nm, two or more pigment particles may be coated with a polymer, so that single nuclear particles cannot be obtained in the production of electrophoretic particles, and when the resulting electrophoretic particles are used in an electrophoretic display device, display properties such as display stability and contrast may be reduced.

In addition, it is desirable that the thickness of a polymer layer may preferably be in the range of ±50%, more preferably ±30%, and still more preferably ±20%, at any part, based on the average value of thickness. As used herein, the term "average value of thickness" refers to an average value of thickness as measured at five parts chosen at random in the polymer layer. When the thickness of a polymer layer is not in the range of ±50%, based on the average value of thickness, the thickness of a polymer layer becomes uneven, so that variation occurs in the dispersibility of electrophoretic particles in a dispersing medium, and when the resulting electrophoretic particles are used in an electrophoretic display device, display properties such as display sharpness and contrast may be reduced.

In the electrophoretic particle of the present invention, 50% or higher of the entire surface of a pigment particle is coated with a polymer layer. In other words, the coating ratio of the polymer layer to the entire surface of the pigment particle (hereinafter referred to as the "polymer coating ratio") is 50% or higher. The polymer coating rate may preferably be 70% or higher, more preferably 90% or higher, and still more preferably 100%. As used herein, the polymer coating ratio of "100%" means that the entire surface of a pigment particle is closely (with substantially no gaps) coated with a polymer layer. When the polymer coating ratio is lower than 50%, the dispersibility of electrophoretic particles in a dispersing medium may be reduced, and when the resulting electrophoretic particles are used in an electrophoretic display device, display properties such as display stability and contrast may be reduced, or display properties under a high humidity may be deteriorated.

The average diameter of the electrophoretic particles of the present invention, although it is not particular limited, may preferably have a lower limit of 0.05 µm, more preferably 0.08 µm, still more preferably 0.1 µm, and an upper limit of 1.5 µm, more preferably 1.2 µm, still more preferably 1 µm, as expressed in volume average particle diameter. When the electrophoretic particles have the average particle diameter of smaller than 0.05 µm, they cannot have a sufficient degree of chroma, and when used in an electrophoretic display device, contrast maybe reduced, so that display may become unclear. In contrast, when the electrophoretic particles have the average particle diameter of greater than 1.5 µm, it may be necessary to raise the coloring degree of the particles themselves more than as needed, the amount of pigments to be used may be increased, the rapid movement of the electrophoretic particles may become difficult at a part to which a voltage is applied for displaying, and their speed of response (display responsiveness) may be decreased.

When the electrophoretic particles of the present invention are dispersed in a dispersing medium (i.e., a solvent for dispersing the electrophoretic particles when used in an electrophoretic display device), a zeta potential exhibited by their dispersion, although it is not particularly limited, may preferably be 30 mV or higher, more preferably 40 mV or higher, and still more preferably 50 mV or higher, as expressed in absolute value. The zeta potential may be positive or negative, which is not particularly limited, so far as the absolute value thereof is great. When the absolute value of a zeta potential is 30 mV or higher, display properties such as display responsiveness and contrast may greatly be improved in the case where the electrophoretic particles are used in an electrophoretic display device.

The electrophoretic particles of the present invention may be those having a positive or negative zeta potential exhibited by their dispersion in a dispersing medium, when used in a one-particle-type electrophoretic display device, or may be a combination of those having a positive zeta potential exhibited by their dispersion in a dispersing medium and those having a negative zeta potential exhibited by their dispersion in a dispersing medium, when used in a two-particle-type electrophoretic display device. In the case of a two-particle-type electrophoretic display device, it is necessary that these electrophoretic particles should have different optical reflection properties such as color tone for the improvement of contrast.

<<Process for Producing Electrophoretic Particle>>

A process for producing an electrophoretic particle according to the present invention is not particularly limited, so far as electrophoretic particles meeting the above requirements can be obtained; however, preferred is, for example, the following production process.

A process for producing an electrophoretic particle according to the present invention is a process for producing an electrophoretic particle comprising a pigment particle and a polymer layer formed on the surface of the pigment particle by carrying out radical polymerization using a polymerization initiator in the state where the pigment particles and monomer components are present in a solvent. The production process of the present invention is characterized in that, when the "dispersion polymerization" is carried out, the pigment particle is a pigment particle having the average particle diameter of 1 µm or smaller which has been mixed with a coupling agent having a polymerizable reactive group prior to the radical polymerization; the amount of the coupling agent having a polymerizable reactive group to be used is 0.1% to 5% by weight, based on the amount of the pigment particle to be used; the solvent comprises a hydrophilic organic solvent and water, and the ratio of the water to be added is 10% to 30% by weight, based on the total amount of the solvent; the monomer components comprise a hydrophilic monomer and a hydrophobic monomer, and the ratio of the hydrophilic monomer to be added is 5% to 30% by weight, based on the total amount of the monomer components; and the polymerization initiator is water soluble, and the concentration of the monomer components is 0.5% to 5% by weight, based on a total amount of the solvent and the monomer components.

The process for producing an electrophoretic particle according to the present invention (hereinafter referred to as the "production process of the present invention") will be described below in detail and, upon its implementation, regarding the general procedures and conditions of the "dispersion polymerization," previously known techniques can appropriately be selected and used.

In the production process of the present invention, it is important to use a solvent comprising a hydrophilic organic solvent and water. The combined use of a hydrophilic organic solvent and water can keep sufficiently better the monodisperse state of a pigment particle as a raw material and the monodisperse state of the resulting electrophoretic particle without using a dispersion stabilizer such as a surfactant.

The hydrophilic organic solvent, although it is not particularly limited, may appropriately be selected depending on the kinds of monomer components or the kind of a polymer to be synthesized. Examples of the hydrophilic organic solvent may include alcohols such as methanol, ethanol, isopropyl alcohol, n-propyl alcohol, and allyl alcohol; glycols such as ethylene glycol, propylene glycol, butylene glycol, hexylene glycol, pentane diol, hexane diol, heptane diol, and dipropylene glycol; ketones such as acetone, methyl ethyl ketone, and methyl propyl ketone; esters such as methyl formate, ethyl formate, methyl acetate, and methyl acetoacetate; and glycol ethers such as diethylene glycol monomethyl ether, diethylene glycol monoethyl ether, diethylene glycol dimethyl ether, ethylene glycol monomethyl ether, ethylene glycol monoethyl ether, and dipropylene glycol monomethyl ether. These organic solvents may be used alone, or two or more kinds of them may be used in combination. Particularly preferred is a solvent which is a poor solvent for a polymer to be synthesized from monomer components described later, or in other words, a solvent which can dissolve monomer components, but cannot dissolve a polymer to be synthesized from the monomer components.

In the production process of the present invention, it is important that the ratio of water to be added is 10% to 30% by weight, based on the total amount of a hydrophilic organic solvent and water contained in a solvent. The ratio of water to be added may preferably have a lower limit of 12% by weight, more preferably 14% by weight, and an upper limit of 28% by weight, more preferably 26% by weight. When the ratio of water to be added is lower than 10% by weight, a polymer layer cannot sufficiently be formed on the surface of each pigment particle, or the average thickness of a polymer layer cannot fall within a prescribed range. In contrast, when the ratio of water to be added is higher than 30% by weight, the polymerization rate of all monomer components may be increased, but the polymerization reaction of monomer components may be promoted at a place other than the surfaces of pigment particles (i.e., in a solvent), so that many particles made only of a polymer may be produced and, as a result, a polymer layer cannot sufficiently be formed on the surface of each pigment particle.

In the production process of the present invention, any other solvent may further be used in addition to a hydrophilic organic solvent and water. Examples of the other solvent may include pentane, isopentane, cyclopentane, hexane, cyclohexane, octane, benzene, toluene, xylene, ethylbenzene, aminylsqualene, petroleum ether, terpene, castor oil, soybean oil, n-paraffin, isoparaffin, and kerosene. These other solvents may be used alone, or two or more kinds of them may be used in combination. When any other solvent is used, the ratio of the other solvent to be used, although it is not particularly limited, may preferably be 30% or lower by weight, more preferably 25% or lower by weight, still more preferably 20% or lower by weight, based on the total amount of a hydrophilic organic solvent and water.

In the production process of the present invention, radical polymerization is carried out using a polymerization initiator in the state where pigment particles and monomer components are present in a solvent. Examples of the pigment particle may include those listed above as a pigment particle forming an electrophoretic particle. The pigment particles have been dispersed in a solvent prior to the radical polymerization.

The concentration of pigment particles to be dispersed in a solvent, although it is not particularly limited, may appropriately be selected, taking into consideration the average particle diameter of the pigment particles, and the average thickness of a polymer layer to be formed. For example, the concentration of pigment particles may preferably have a lower limit of 5% by weight, more preferably 10% by weight, still more preferably 15% by weight, and an upper limit of 60% by weight, based on the total amount of a solvent and pigment particles. When the concentration of pigment particles is lower than 5% by weight, electrophoretic particles cannot effectively be produced. In contrast, when the concentration of pigment particles is higher than 60% by weight, the pigment particles may be aggregated during the polymerization reaction, so that a polymer layer cannot sufficiently be formed on the surface of each pigment particle.

A method of dispersing pigment particles in a solvent, although it is not particularly limited, may appropriately be selected, and used, from the previously known dispersing methods. Examples of the dispersing method may include a method of dispersing pigment particles by irradiation with ultrasound, a method of dispersing pigment particles using a media mill, and a method of dispersing pigment particles utilizing the friction of the pigment particles due to ultra-high-speed stirring. In these dispersing methods, preferred is a method of dispersing pigment particles using a media mill because it is excellent from an industrial point of view.

In the production process of the present invention, a dispersion stabilizer may be used when pigment particles are dispersed in a solvent. The amount of a dispersion stabilizer to be used, although it is not particularly limited, may preferably be 1% or lower by weight, more preferably 0.5% or lower by weight, still more preferably 0.1% or lower by weight, based on the total amount of a solvent. However, it is particularly preferred to use no dispersion stabilizer. When the amount of a dispersion stabilizer to be used is higher than 1% by weight, particles made only of a polymer may easily be produced at a place other than the surfaces of pigment particles (i.e., in a solvent), so that a polymer layer cannot effectively be formed on the surface of each pigment particle. Examples of the dispersion stabilizer may include previously known surfactants, and polymer dispersion stabilizers such as Poval.

In the production process of the present invention, it is important to use monomer components comprising a hydrophilic monomer (hydrophilic polymerizable monomer) and a hydrophobic monomer (hydrophobic polymerizable monomer). In the production process of the present invention, because radical polymerization is carried out using a water-soluble polymerization initiator, the combined use of a hydrophilic monomer and a hydrophobic monomer can preferentially initiate the polymerization reaction of the hydrophilic monomer. For this reason, only a hydrophobic monomer is successively polymerized, and the undesired synthesis of particles made only of a polymer can effectively be prevented.

Examples of the hydrophilic monomer may include acrylic acid, methacrylic acid, methyl acrylate, methyl methacrylate, ethyl acrylate, allyl acrylate, glycidyl acrylate, glycidyl methacrylate, acrylamide, acrylonitrile, acrylic acid chloride, methacrylic acid chloride, allylacetic acid, allyl alcohol, allyl chloride, allylamine, allyl isocyanate, methyl vinyl ketone, ethyl vinyl ketone, vinyl acetate, vinyl chloride, ethyl vinyl ether, and sodium styrenesulfonate. These hydrophilic monomers may be used alone, or two or more kinds of them may be used in combination.

Examples of the hydrophobic monomer may include styrene, methylstyrene, divinylbenzene, ethyl methacrylate, butyl acrylate, butyl methacrylate, lauryl acrylate, lauryl methacrylate, stearyl acrylate, stearyl methacrylate, behenyl acrylate, behenyl methacrylate, cyclohexyl acrylate, cyclohexyl methacrylate, trifluoropropyl acrylate, and trifluoropropyl methacrylate. These hydrophobic monomers may be used alone, or two or more kinds of them may be used in combination.

In the production process of the present invention, it is important that the ratio of a hydrophilic monomer to be added is 5% to 30% by weight, based on the total amount of monomer components. The ratio of a hydrophilic monomer to be added may preferably have an upper limit of 25% by weight, more preferably 20% by weight. When the ratio of a hydrophilic monomer to be added is lower than 5% by weight, the polymerization reaction may be delayed as a whole, so that it may take a long time to increase a polymerization rate. In contrast, when the ratio of a hydrophilic monomer to be added is higher than 30% by weight, the hydrophilic monomer may be polymerized at a place other than the surfaces of pigment particles (i.e., in a solvent), so that particles made only of a polymer may easily be produced and a polymer layer cannot effectively be formed on the surface of each pigment particle.

In the production process of the present invention, it is preferred that at least a part of the monomer components (hydrophilic monomer and hydrophobic monomer) may be a monomer having an electrifiable group. The use of a monomer having an electrifiable group can attain that, for example, when pigment particles do not have electrophoretic properties, a polymer layer can be formed on the surfaces of the pigment particles and electrophoretic properties can be given to the pigment particles.

Examples of the hydrophilic monomer having an electrifiable group may include acrylamide, N,N-dimethylaminoethyl methacrylate, methacrylolylethyltrimethylammonium chloride, and allylamine. These hydrophilic monomers may be used alone, or two or more kinds of them may be used in combination.

Examples of the hydrophobic monomer having an electrifiable group may include trifluoroethyl methacrylate, and perfluorooctylethyl methacrylate. These hydrophobic monomers may be used alone, or two or more kinds of them may be used in combination.

The amount of a monomer having an electrifiable group to be used, although it is not particularly limited, may appropriately be adjusted, for example, when a coupling agent having an electrifiable group is used, in such a manner that the amount of electrification to be given can be obtained, taking into consideration the amount of the coupling agent to be used. For example, the amount of a monomer having an electrifiable group to be used may preferably have a lower limit of 1% by weight, more preferably 2% by weight, still more preferably 3% by weight, and an upper limit of 50% by weight, more preferably 30% by weight, still more preferably 20% by weight, based on the total amount of monomer components.

In the production process of the present invention, it is important to carry out radical polymerization using a water-soluble polymerization initiator. The use of a water-soluble polymerization initiator can selectively initiate the polymerization reaction of a hydrophilic monomer.

Examples of the water-soluble polymerization initiator may include potassium persulfate, sodium persulfate, ammonium persulfate, 2,2'-azobis(2,4-dimethylvaleronitrile), 2,2'-azobis(2-methylpropionamidine)dihydrochloride, and hydrogen peroxide. These polymerization initiators may be used alone, or two or more kinds of them may be used in combination.

The amount of a water-soluble polymerization initiator to be used, although it is not particularly limited, may preferably have a lower limit of 0.05% by weight, more preferably 0.1% by weight, still more preferably 0.2% by weight, and an upper limit of 10% by weight, more preferably 5% by weight, still more preferably 3% by weight, based on the total amount of monomer components.

In the production process of the present invention, it is important that the concentration of monomer components is 0.5% to 5% by weight, based on the total amount of a solvent and monomer components. The concentration of monomer components may preferably have a lower limit of 1% by weight, and an upper limit of 3% by weight. When the concentration of monomer components is lower than 0.5% by weight, the polymerization reaction cannot rapidly proceed, so that a sufficiently high polymerization rate cannot be obtained. In contrast, when the concentration of monomer components is higher than 5% by weight, particles made only of a polymer may easily be produced at a place other than the surfaces of pigment particles (i.e., in a solvent), so that a polymer layer cannot effectively be formed on the surface of each pigment particle. The total amount of monomer components is the total amount of monomer components which have been added to a solvent until the completion of a polymerization reaction, and it does not depend on an addition method.

In the production process of the present invention, it is important that pigment particles have been mixed with a coupling agent having a polymerizable reactive group prior to the radical polymerization. The coupling agent having a polymerizable reactive group is used by mixing with pigment particles for the purpose of treating (coating) the surfaces of the pigment particles. The use of a coupling agent having a polymerizable reactive group can attain that pigment particles becomes to have the polymerizable reactive group on the surface of each pigment particle; therefore, polymer synthesis on the surface of each pigment particle can further be promoted and a polymer layer can easily be formed contiguously and evenly on the surface of each pigment particle.

As a coupling agent having a polymerizable reactive group, for example, there can be used a coupling agent having a vinyl group or a coupling agent having an allyl group. These coupling agents may be used alone, or two or more kinds of them may be used in combination. In these coupling agents, preferred is a coupling agent having a vinyl group because it has high polymerization reactivity.

Examples of the coupling agent having a vinyl group may include alkoxysilanes such as vinyltrimethoxysilane, vinyltriethoxysilane, vinyltris(β-methoxyethoxy)silane, and dimethylvinylmethoxysilane; chlorosilanes such as vinyltrichlorosilane, and dimethylvinylchlorosilane; methacryloxysilanes such as γ-methacryloxypropyltrimethoxysilane, and γ-methacryloxypropylmethyldimethoxysilane; quaternary ammonium salts such as N-β-(N-vinylbenzylaminoethyl)-γ-aminopropyltrimethoxy silane; titanates such as isopropyldimethacrylisostearoyl titanate, and isopropyldiacrylisostearoyl titanate. These coupling agents may be used alone, or two or more kinds of them may be used in combination.

Examples of the coupling agent having an allyl group may include allyldimethylpiperidinomethylsilane, allylchlorodimethylsilane, allyltriethoxysilane, allyltrichlorosilane, and allyltrimethylsilane. These coupling agents may be used alone, or two or more kinds of them may be used in combination.

It is preferred that the coupling agent having a polymerizable reactive group further has a hydrophilic group. In this case, the polymerizable reactive group and the hydrophilic group may be the same or different substituent groups. The use of a coupling agent having a polymerizable reactive group and a hydrophilic group can make hydrophilic the surface of each pigment particle, so that the polymerization reaction of a hydrophilic monomer on the surface of each pigment particle can further be promoted.

The mixing of a coupling agent having a polymerizable reactive group with pigment particles is not particularly limited, so far as it is carried out before the initiation of a radical polymerization reaction; for example, the mixing may be any of before, at the same time as, or after the dispersing of pigment particles in a solvent. The mixing at the same time as the dispersing of pigment particles in a solvent is preferred because the surface of each pigment particle can effectively be treated (coated) with a coupling agent and also from the viewpoint of a production cost.

In the production process of the present invention it is important that the amount of a coupling agent having a polymerizable reactive group to be used is 0.1% to 5% by weight, based on the amount of pigment particles to be used. The amount of a coupling agent having a polymerizable reactive group to be used may preferably have a lower limit of 0.2% by weight, more preferably 0.5% by weight, and an upper limit of 4.5% by weight, more preferably 4% by weight, based on the amount of pigment particles to be used. When the amount of a coupling agent having a polymerizable reactive group to be used is lower than 0.1% by weight, a polymer layer cannot sufficiently be formed on the surface of each pigment particle. In contrast, when the amount of a coupling agent having a polymerizable reactive group to be used is higher than 5% by weight, self-condensed particles of the coupling agent may be produced.

In the production process of the present invention, in addition to a coupling agent having a polymerizable reactive group, a coupling agent having no polymerizable reactive group maybe used. Examples of the coupling agent having no polymerizable reactive group may include glycidoxypropyltrimethoxysilane, glycidoxypropylmethyldiethoxysilane, aminoethylaminopropylmethyldimethoxysilane, aminoethylaminopropyltriethoxysilane, aminopropyltrimethoxysilane, octadecyldimethyltrimethoxysilylpropylammonium chloride, and octadecyltrimethoxysilane. These coupling agents may be used alone, or two or more kinds of them may be used in combination. The amount of a coupling agent having no polymerizable reactive group to be used, although it is not particularly limited, may preferably be 200 parts or smaller by weight, more preferably 150 parts or smaller by weight, still more preferably 100 parts or smaller by weight, based on 100 parts by weight of a coupling agent having a polymerizable reactive group.

In the production process of the present invention, it is preferred that at least a part of a coupling agent having a polymerizable reactive group and a coupling agent having no polymerizable reactive group is a coupling agent having an electrifiable group, and it is more preferred that at least a part of a coupling agent having a polymerizable reactive group is a coupling agent having an electrifiable group. The use of a coupling agent having an electrifiable group, when pigment particles have no electrophoretic properties, can attain the treatment of the surface of each pigment particle with the coupling agent and, at the same time, can provide the pigment particles with electrophoretic properties.

In the coupling agent having a polymerizable reactive group, examples of the coupling agent having an electrifiable group may include N-[N-(vinylbenzyl)-2-aminoethyl]-3-aminopropyl-trimethoxysilane, N-(vinylbenzyl)-3-aminopropyltrimethoxysilane, N-allyl-3-aminopropyltrimethoxysilane, and N-(N-allyl-2-aminoethyl)-3-aminopropyl-trimethoxysilane. These coupling agents may be used alone, or two or more kinds of them may be used in combination.

In the coupling agent having no polymerizable reactive group, examples of the coupling agent having an electrifying group may include 3-aminopropyltrimethoxysilane, N-aminoethyl-3-aminopropylmethyldiethoxysilane, octadecyldimethyl[3-(trimethoxysilyl)propyl]ammonium chloride, 3-chloropropyltrimethoxysilane, 2-trifluoromethylethylmethoxysilane, perfluorooctylethyltrimethoxysilane, and 3-ureidopropyltriethoxysilane. These coupling agents may be used alone, or two or more kinds of them may be used in combination.

The amount of a coupling agent having an electrifiable group to be used, although it is not particularly limited, may appropriately be adjusted, for example, when a monomer having an electrifiable group is used, in such a manner that the amount of electrification to be given can be obtained, taking into consideration the amount of the coupling agent to be used. The amount of a coupling agent having an electrifiable group to be used may preferably have a lower limit of 0.1% by weight, more preferably 0.2% by weight, still more preferably 0.5% by weight, and an upper limit of 5% by weight, more preferably 4% by weight, still more preferably 3% by weight, based on the amount of pigment particles to be used.

In the production process of the present invention, the addition of monomer components, although it is not particularly limited, may be bulk addition before the initiation of radical polymerization, or fractional addition (continuous addition and/or intermittent addition) during radical polymerization.

In the production process of the present invention, the reaction temperature for radical polymerization, although it is not particularly limited, may preferably have a lower limit of 40° C., more preferably 50° C., and an upper limit of 90° C., more preferably 80° C. The reaction time for radical polymerization, although it is not particularly limited, may preferably have a lower limit of 1 hour, more preferably 2 hours, still more preferably 3 hours, and an upper limit of 24 hours, more preferably 12 hours, still more preferably 8 hours. It is preferred that a radical polymerization reaction may be carried out under stirring.

In the production process of the present invention, a method of collecting electrophoretic particles after radical polymerization is not particularly limited. Examples thereof may include a method in which the resulting polymerization reaction solution is separated by centrifugation into a supernatant and a settled material, which is then collected and dried. The collected settled material is dispersed again in a prescribed solvent, if necessary, and separated by centrifugation into a supernatant and a settled material, these procedures being repeated and followed by drying.

According to the production process of the present invention, when radical polymerization is carried out, the polymerization rate of all monomer components (hereinafter referred to as the "total polymerization rate")=(total amount of synthesized polymer/total use amount of monomer components)×100 can be attained at a sufficiently high level. The total polymerization rate, although it is not particularly limited, may preferably be 80% or higher by weight, more preferably 85% or higher by weight, still more preferably 90% or higher by weight.

According to the production process of the present invention, when radical polymerization is carried out, the polymerization rate of monomer components corresponding to a polymer synthesized so that the surface of each pigment particle is covered (hereinafter referred to as the "polymerization rate of a coating material")=(total amount of a polymer synthesized so that surface of each pigment particle is covered/total use amount of monomer components)×100, in addition to the total polymerization rate, can be attained at a sufficiently high level, and the polymerization rate of monomer components corresponding to a polymer synthesized only in a solvent without coating the surface of each pigment particle (hereinafter referred to as the "polymerization rate in a solvent")=(total amount of a polymer synthesized only in a solvent/total use amount of monomer components)×100 can be reduced at a low level. The polymerization rate of a coating material, although it is not particularly limited, may preferably be 75% or higher by weight, more preferably 78% or higher by weight, still more preferably 80% or higher by weight. The polymerization rate in a solvent is a value obtained by subtracting the polymerization rate of a coating material from the total polymerization rate.

<<Dispersion for Electrophoretic Display>>

The electrophoretic particles of the present invention are used in a dispersion for electrophoretic display by dispersing them in a dispersing medium. The dispersion for electrophoretic display of the present invention is characterized in that it comprises the electrophoretic particles of the present invention in a dispersing medium. The dispersion of the present invention may comprise electrophoretic particles each having either a positive or a negative zeta potential exhibited by their dispersion when dispersed in a dispersing medium in the case where the dispersion is used in a one-particle-type electrophoretic display device, or may comprise a combination of electrophoretic particles each having a positive zeta potential exhibited by their dispersion when dispersed in a dispersing medium and electrophoretic particles each having a negative zeta potential exhibited by their dispersion when dispersed in a dispersing medium in the case where the dispersion is used in a two-particle-type electrophoretic display device.

The concentration of electrophoretic particles in a dispersion for electrophoretic display, although it is not particularly limited, may preferably have a lower limit of 5% by weight, and an upper limit of 60% by weight, more preferably 50% by weight, still more preferably 40% by weight. When the concentration of electrophoretic particles is lower than 5% by weight, the electrophoretic particles cannot have a sufficient degree of chroma, and when used in an electrophoretic display device, contrast may be reduced, so that display may become unclear. In contrast, when the concentration of electrophoretic particles is higher than 60% by weight, the dispersion may have an increased viscosity, so that dispersion treatment becomes difficult, and the electrophoretic particles may cause aggregation at a part to which a voltage is applied for displaying, so that their speed of response (display responsiveness) may be decreased.

As a dispersing medium for dispersing electrophoretic particles, there can be used any of the previously known dispersing mediums which have been widely used in a dispersion for electrophoretic display, but it is not particularly limited, for example, preferred being organic solvents.

Examples of the organic solvent to be used as a dispersing medium may include aromatic hydrocarbons including benzene hydrocarbons such as benzene, toluene, o-xylene, m-xylene, p-xylene, mixed xylene, ethylbenzene, hexylbenzene, dodecylbenzene, and phenylxylylethane; aliphatic hydrocarbons including paraffin hydrocarbons such as n-hexane, and n-decane, isoparaffin hydrocarbons such as ISOPAR (available from Exxon Chemicals), olefin hydrocarbons such as 1-octene, and 1-decene, and naphthene hydrocarbons such as cyclohexane, and decalin; hydrocarbon mixtures derived from petroleum or coal such as kerosene, petroleum ether, petroleum benzin, ligroin, industrial gasoline, coal tar, naphtha, petroleum naphtha, and solvent naphtha; esters such as ethyl acetate and butyl acetate; ketones such as acetone, methyl ethyl ketone, and methyl isobutyl ketone; alcohols such as methanol, ethanol, isopropanol, octanol, and methylcellosolve; halogenated hydrocarbons such as dichloromethane, chloroform, carbon tetrachloride, 1,2-dichloroethane, 1,1,1-trichloroethane, 1,1,2,2-tetrachloroethane, trichlorofluoroethane, tetrabromoethane, dibromotetrafluoroethane, tetrafluorodiiodoethane, 1,2-dichloroethylene, trichloroethylene, tetrachloroethylene, trichlorofluoroethylene, chlorobutane, chlorocyclohexane, chlorobenzene, o-dichlorobenzene, bromobenzene, iodomethane, diiodomethane, and iodoform; silicone oils such as dimethyl silicone oil, and methylphenyl silicone oil; fluorine solvents such as hydrofluoroether; carbon disulfide. These organic solvents may be used alone, or two or more kinds of them may be used in combination. In these organic solvents, preferred are hexylbenzene, long-chain alkyl benzenes such as dodecylbenzene, and phenylxylylethane because of their higher boiling points and flash points and their little toxicity.

The amount of a dispersing medium to be used, although it is not particularly limited, may preferably have a lower limit of 40% by weight, more preferably 50% by weight, still more preferably 60% by weight, and an upper limit of 95% by weight, more preferably 92% by weight, still more preferably 90% by weight, based on the total amount of the resulting dispersion. When the amount of a dispersing medium to be used is lower than 40% by weight, the viscosity of a dispersion may be increased, so that the electrophoretic properties of electrophoretic particles may be deteriorated. In contrast, when the amount of a dispersing medium to be used is higher than 95% by weight, the concentration of electrophoretic particles may be decreased, so that when used in an electrophoretic display device, display properties such as contrast may be deteriorated.

The dispersing medium may preferably be colored with a dye or the like for the purpose of enhancing contrast to electrophoretic particles when a dispersion for electrophoretic display containing the electrophoretic particles in the dispersing medium is used in a one-particle-type electrophoretic display device. In contrast, when used in a two-particle-type electrophoretic display device, the dispersing medium may preferably be colorless and transparent so that it does not deteriorate optical reflection properties such as contrast of at least two kinds of electrophoretic particles having different tones.

When a dispersing medium is colored, a dye used in coloring, although it is not particularly limited, may preferably be any of oil-soluble dyes. In particular, from a viewpoint of easy use, azo dyes and anthraquinone dyes are more preferred. Examples of the azo dye and the anthraquinone dye may include azo compounds such as OIL YELLOW 3G (available from Orient Chemical Industries, Ltd.) as yellow dyes; azo compounds such as FAST ORANGE G (available from BASF AG) as orange dyes; anthraquinones such as MACROLEX BLUE RR (available from Bayer AG) as blue dyes; anthraquinones such as SUMIPLAST GREEN G (available from Sumitomo Chemical Co., Ltd.) as green dyes; azo compounds such as OIL BROWN GR (available from Orient Chemical Industries, Ltd.) as brown dyes; azo compounds such as OIL RED 5303 (available from Arimoto Chemical Co., Ltd.) and OIL RED 5B (available from Orient Chemical Industries, Ltd.) as red dyes; anthraquinones such as OIL VIOLET # 730 (available from Orient Chemical Industries, Ltd.) as violet dyes; azo compounds such as SUDAN BLACK X60 (available from BASF AG) as black dyes, and mixtures of anthraquinone series MACROLEX BLUE FR (available from Bayer AG) and azo series OIL RED XO (available from Kanto Kagaku). These dyes may be used alone, or two or more kinds of them may be used in combination.

The amount of a dye to be used, although it is not particularly limited, may preferably have a lower limit of 0.1 parts by weight, more preferably 0.5 parts by weight, still more preferably 1 part by weight, and an upper limit of 10 parts by weight, based on 100 parts by weight of a dispersing medium. When the amount of a dye to be used is lower than 0.1 parts by weight, the coloring of a dispersing medium may become insufficient, so that sufficient contrast to electrophoretic particles cannot be obtained. In contrast, when the amount of a dye to be used is higher than 10 parts by weight, the dye may be used more than as needed, so that the cost of production may become increased.

The dispersion for electrophoretic display may contain other components, if necessary, in addition to electrophoretic particles and a dispersing medium. Examples of other components may include a dispersant, a charge controller, and a viscosity modifier.

The dispersant is used, for example, in order to assist the dispersing of electrophoretic particles in a dispersing medium. Examples of the dispersant which can be added to a dispersion may include anionic surfactants, cationic surfactants, amphoteric surfactants, nonionic surfactants, fluorine surfactants, sorbitan fatty acid ester surfactants such as sorbitan sesquioleate, dispersants such as block polymers and graft polymers, and various coupling agents, which can be dissolved in a dispersing medium. These dispersants may be used alone, or two or more kinds of them may be used in combination.

The amount of a dispersant to be used, although it is not particularly limited, may preferably have a lower limit of 0.1 parts by weight, more preferably 0.2 parts by weight, still more preferably 0.5 parts by weight, and an upper limit of 10 parts by weight, more preferably 8 parts by weight, still more preferably 5 parts by weight, based on 100 parts by weight of a dispersing medium. When the amount of a dispersant to be used is lower than 0.1 parts by weight, the effect of dispersing electrophoretic particles may be small. In contrast, when the amount of a dispersant to be used is higher than 10 parts by weight, the effect of dispersing electrophoretic particles may be saturated and, at the same time, the dispersant may be used more than as needed, so that the cost of production may be increased.

The charge controller is used, for example, in order to adjust the electrophoretic properties of electrophoretic particles in a dispersing medium. Examples of the charge controller which can be added to a dispersing medium may include chromium complexes such as Bontron E-81 (Orient Chemical Industries Co., Ltd.); zinc complexes such as BONTRON E-84 (available from Orient Chemical Industries Co., Ltd.); aluminum complexes such as TONBRON E-88 (available from Orient Chemical Industries Co., Ltd.); phenol condensates such as BONTRON E89 (available from Orient Chemical Industries Co., Ltd.); azine compounds such as BONTRON N-01 (available from Orient Chemical Industries Coo., Ltd.); azochrome complexes such as BONTRON S-34 (available from Orient Chemical Industries Co., Ltd.); and iron complexes such as BONTRON X-11 (available from Orient Chemical Industries Co., Ltd.). These charge controllers may be used alone, or two or more kinds of them may be used in combination.

The amount of a charge controller to be used, although it is not particularly limited, may preferably have a lower limit of 0.01 parts by weight, more preferably 0.05 parts by weight, still more preferably 0.1 parts by weight, and an upper limit of 5.0 parts by weight, more preferably 3.0 parts by weight, still more preferably 2.0 parts by weight, based on 100 parts by weight of a dispersing medium. When the amount of a charge controller to be used is lower than 0.01 parts by weight, the effect of adjusting electrophoretic properties may be small. In contrast, when the amount of a charge controller to be used is higher than 5.0 parts by weight, the effect of adjusting electrophoretic properties may be saturated and, at the same time, the charge controller may be used more than as needed, so that the cost of production may be increased.

The viscosity modifier is used, for example, in order to prevent the settlement of electrophoretic particles in a dispersing medium. Examples of the viscosity modifier which can be added to a dispersing medium may include vegetable oil polymerization compounds such as DISPARON 101 (available from Kusumoto Chemicals, Ltd.), polyether-ester surfactants such as DISPARON 3350 (available from Kusumoto Chemical, Ltd.), hydrogenated castor oil compounds such as DISPARON 305 (available from Kusumoto Chemicals, Ltd.), aliphatic amide waxes such as DISPARON 6500 (available from Kusumoto Chemical, Ltd.), and organic modified smectites such as BENTON 760 (available from Elementis plc). These viscosity modifiers may be used alone, or two or more kinds of them may be used in combination.

When the viscosity modifier is used, the amount of the viscosity modifier to be used, although it is not particularly limited, may preferably have a lower limit of 0.01 parts by weight, more preferably 0.05 parts by weight, still more preferably 0.1 parts by weight, and an upper limit of 10 parts by weight, more preferably 5 parts by weight, still more preferably 1 part by weight, based on 100 parts by weight of a dispersing medium. When the amount of a viscosity modifier to be used is lower than 0.01 parts by weight, the effect of adjusting the viscosity of a dispersion may be small. In contrast, when the amount of a viscosity modifier to be used is higher than 10 parts by weight, the viscosity of a dispersion may become too high.

A dispersion for electrophoretic display containing electrophoretic particles in a dispersing medium can be produced by dispersing the electrophoretic particles in the dispersing medium.

The electrophoretic particles may be isolated, and used as a powder, or may be used as a dispersion containing the electrophoretic particles in a prescribed dispersing medium. In the latter case, the term "dispersion" refers to a mixture containing electrophoretic particles in a dispersing medium, and it may be any form ranging from a liquid having a low viscosity to a slurry having a high viscosity. The dispersing medium used in such a dispersion may preferably be the same kind of dispersing medium as a dispersing medium used in a dispersion for electrophoretic display.

As the method of dispersing electrophoretic particles in a dispersing medium, although it is not particularly limited, there can be used any of previously known fine particle dispersing techniques. Examples of the dispersing method may include a method of carrying out dispersing treatment after or during the addition of electrophoretic particles to a dispersing medium; a method of carrying out dispersing treatment after or during the addition of a dispersing medium to electrophoretic particles; a method of carrying out dispersing treatment after or during the mixing of electrophoretic particles and a dispersing medium; and a method of further carrying out dispersing treatment after or during the addition of a remaining dispersing medium to a dispersion in which electrophoretic particles have been dispersed in a part of the dispersing medium. The dispersing treatment may be carried out using any of the previously known means, which is not particularly limited. For example, there can be used an ultrasound homogenizer, a paint shaker, a ball mill, a sand grinding mill, and a V blender.

When electrophoretic particles are treated with a coupling agent at the same time that dispersing treatment is carried out, for example, there can be used a dry method of spraying a coupling agent with dry air or nitrogen gas while forcibly stirring a dispersing medium and electrophoretic particles with a V blender; a wet method of adding a coupling agent in a state where electrophoretic particles are appropriately dispersed in a dispersing medium to form a slurry; and a spray method of spraying a coupling agent while vigorously stirring a pre-warmed dispersing medium and electrophoretic particles.

<<Microcapsule for Electrophoretic Display>>

The dispersion for electrophoretic display according to the present invention can be used for a microcapsule for electrophoretic display by encapsulating it into a capsule shell. The microcapsule for electrophoretic display according to the present invention (hereinafter referred to as the "microcapsule" in some cases) is formed by the encapsulation of a dispersion for electrophoretic display according to the present invention in a capsule shell. The microcapsule of the present invention, when used in a one-particle-type electrophoretic device, includes a dispersion for electrophoretic display containing electrophoretic particles having either a positive zeta potential or a negative zeta potential exhibited by their dispersion when dispersed in a dispersing medium and, when used in a two-particle-type electrophoretic display device, includes a dispersion for electrophoretic display containing a combination of electrophoretic particles having a positive zeta potential exhibited by their dispersion when dispersed in a dispersing medium and electrophoretic particles having a negative a zeta potential exhibited by their dispersion when dispersed in a dispersing medium. The dispersion for electrophoretic display may preferably keep a dispersion state at the time of production even after encapsulated in a capsule shell, and it is not necessary that the dispersion retains entirely the same dispersion state as the dispersion state at the time of production.

The shape of microcapsules, although it is not particularly limited, may preferably be a particulate shape such as a spherical shape. FIG. 1 is a schematic cross-sectional view showing one example of a microcapsule used in a one-particle-type electrophoretic display device, which microcapsule is included in the microcapsule of the present invention. In the microcapsule 1, capsule shell 2 includes a dispersion for electrophoretic display containing electrophoretic particles 4, 4, . . . , and 4 in dispersing medium 3.

When microcapsules are particulate, their average particle diameter, although it is not particularly limited, may preferably have a lower limit of 10 µm, more preferably 15 µm, still more preferably 20 µm, and an upper limit of 300 µm, more preferably 200 µm, still more preferably 150 µm, as expressed in volume average particle diameter. When the average particle diameter of microcapsules is lower than 10 µm, a sufficient display concentration cannot be obtained in a display part when the microcapsules are used in an electrophoretic display device, so that display properties may be deteriorated. In contrast, when the average particle diameter of microcapsules is higher than 300 µm, the mechanical strength of the microcapsules may become insufficient, so that the cracking of the microcapsules may be increased and, when the microcapsules are used in an electrophoretic display device, electrophoretic particles in a dispersion encapsulated in the microcapsules cannot exhibit sufficient electrophoretic properties, so that a driving voltage for displaying may be raised.

The particle size distribution of microcapsules, although it is not particularly limited, may preferably be a particle size distribution such that 80% or higher by volume, more preferably 85% or higher by volume of the microcapsules are present in the particle diameter range of a particle diameter length corresponding to 40% of the maximum peak particle diameter, around the above maximum peak particle diameter (the particle diameter corresponding to the maximum peak in a particle diameter frequency distribution using the volume of microcapsules as a standard). If the particle size distribution is such a particle size distribution that lower than 80% by volume of microcapsules are present in the particle diameter range, when a coating solution with the microcapsules dispersed therein is prepared and this coating solution is coated on a substrate sheet, the microcapsules cannot be coated in one layer, and may partially be coated in a multilayer such as two or more layers.

A capsule shell forming a microcapsule can be formed using the same material as that of a capsule shell in the previously known microcapsule. For example, when microcapsules are produced by a coacervation method, preferred are combinations of compounds each having an isoelectric point, such as gelatin, or cationic compounds such as polyethyleneimine, and anionic compounds such as gum arabic, sodium aluginate, styrene-maleic anhydride copolymers, vinyl methyl ether-maleic anhydride copolymers, phthalic acid esters of starch, and polyacrylic acids. When microcapsules are produced by an in-situ polymerization method, preferred are melanine-formaline resins (melamine-formaline prepolymers), and radical polymerizable monomers. When microcapsules are produced by an interface polymerization method, preferred are combinations of hydrophilic monomers such as polyamines, glycols and polyhydric phenols, and hydrophobic monomers such as polybasic acid halides and polyvalent isocyanates, in which case formed are capsule shells comprising polyamides, epoxy resins, polyurethanes or polyureas.

When a polyvalent amine is used as a crosslinking agent in the production of capsule shells, there can be obtained microcapsules with capsule shells having excellent heat resistant storage stability. The amount of a polyvalent amine to be used is not particularly limited, so far as the desired physical properties necessary for capsule shells cannot extremely be deteriorated. Examples of the polyvalent amine may include aliphatic amines such as ethylenediamine, diethylenetriamine, triethylenetetramine, tetraethylenepentamine, 1,3-propylenediamine, and hexamethylenediamine; epoxy compound adducts of aliphatic polyvalent amines, such as poly(mono- to penta-)alkylene (C2 to C6)polyamine-alkylene (C2 to C18)oxide adducts; aromatic polyvalent amines such as phenylenediamine, diaminonaphthalene, and xylylenediamine; alicyclic polyvalent amines such as piperazine; and heterocyclic diamines such as 3,9-bis-aminopropyl 2,4,8,10-tetraoxaspiro-[5.5]undecane. These polyvalent amines may be used alone, or two or more kinds of them may be used in combination.

The thickness of capsule shells forming microcapsules, although it is not particularly limited, may preferably have a lower limit of 0.1 µm and an upper limit of 5 µm, more preferably 4 µm, still more preferably 3 µm. When the thickness of capsule shells is smaller than 0.1 µm, the mechanical strength of microcapsules may become insufficient, so that the cracking of the microcapsules may be increased. In contrast, when the thickness of capsule shells is greater than 5 µm, the transparency of microcapsules may be reduced, so that contrast may be reduced, and the flexibility of the microcapsules may be reduced, so that adhesiveness to a substrate sheet may become insufficient.

The microcapsules for electrophoretic display according to the present invention can be obtained by any of the previously known processes for producing microcapsules, except that there is used a dispersion for electrophoretic display containing electrophoretic particles of the present invention in a dispersing medium.

Examples of the process for producing microcapsules may include the "interface settlement" methods such as a coacervation method (phase separation method), an in-liquid drying method, a melt degradation cooling method, a spray drying method, a pan coating method, an in-air suspending coating method, and a powder bed method, and the "interface reaction" methods such as an interface polymerization method, an in-situ polymerization method, an in-liquid cured film (coating) method (orifice method), and an interface reaction method (inorganic chemical reaction method). In these processes, preferred are a coacervation method, an in-situ polymerization method, an interface polymerization method, an in-liquid drying method, a melt degradation cooling method. In the microcapsulation step of these processes, as a core material encapsulated in capsule shells, there is used a dispersion for electrophoretic display containing electrophoretic particles of the present invention in a dispersing medium. When such a method is used, microcapsules in which the dispersion is encapsulated in capsule shells can be obtained extremely easily.

In carrying out the microcapsulation step, usually, it is necessary to bring a liquid material (in this case, a dispersion for electrophoretic display) into a state as a core material (e.g., the form of a liquid droplet), a method for doing so is not particularly limited, but a liquid droplet may be formed by spraying or dropwise addition in a vapor phase or by using an orifice, or a liquid droplet may be formed by dispersing a material in an aqueous medium or a non-aqueous medium.

Examples of the aqueous medium may include water, mixtures of water and hydrophilic solvents (e.g., alcohols, ketones, esters, glycols), solutions in which water-soluble polymers (e.g., PVA (polyvinyl alcohol), CMC (carboxymethylcellulose), gelatin, gum arabic) are dissolved in water, solutions in which surfactants (e.g., anionic surfactants, cationic surfactants, nonionic surfactants) are added to water, and solutions in which these aqueous mediums are mixed. Examples of the non-aqueous medium may include organic solvents which are not substantially compatible with a dispersing medium used in a dispersion for electrophoretic display. In these mediums, preferred are aqueous mediums.

The amount of a dispersion for electrophoretic display to be dispersed, although it is not particularly limit, may preferably have a lower limit of 20 parts by weight, more preferably 30 parts by weight, and an upper limit of 200 parts by weight, more preferably 150 parts by weight, based on 100 parts by weight of an aqueous medium or a non-aqueous medium. When the amount of a dispersion for electrophoretic display to be used is lower than 20 parts by weight, microcapsules having a wide particle size distribution may be obtained, leading to a lowering in productivity. In contrast, when the amount of a dispersion for electrophoretic display to be used is higher 200 parts by weight, a reverse suspension may be formed, so that microcapsules cannot be produced.

The amount of a capsule shell raw material to be used, although it is not particularly limited, may preferably have a lower limit of 100 parts by weight, more preferably 500 parts by weight, and an upper limit of 5,000 parts by weight, more preferably 3,000 parts by weight, based on 100 parts by weight of a dispersion for electrophoretic display. When the amount of a capsule shell raw material to be used is lower than 100 parts by weight, or higher than 5,000parts by weight, capsule shells having a desired thickness cannot be obtained.

In carrying out the microcapsulation step, other components may appropriately be used, in addition to a dispersion for electrophoretic display and a capsule shell raw material and, if necessary, an aqueous medium or a non-aqueous medium.

Usually, after microcapsules are produced by the microcapsulation step, the microcapsules are isolated by filtration, if necessary. For example, when the microcapsulation step is carried out by dispersing a dispersion for electrophoretic display in an aqueous medium, microcapsules may preferably be wet classified so that a desired average particle diameter and particle size distribution can be obtained, after the production of the microcapsules, and the microcapsules are separated from the aqueous medium by suction filtration or natural filtration. In addition, in order to remove impurities to improve the quality of a product, the resulting microcapsules may preferably be washed.

In the wet classification of microcapsules, a preparation solution obtained in the microcapsulation step, that is, a preparation solution containing the microcapsules in an aqueous medium is subjected to classification treatment, as it is, or after it is diluted with an appropriate aqueous medium, so that the microcapsules contained in the preparation solution have a desired average particle diameter and particle size distribution. The classification treatment can be carried out by a method or an apparatus using a system such as a sieving system (filter system), centrifugation system, or natural settlement system. In the case of microcapsules having a relatively large average particle diameter, a sieving system is effective.

<<Sheet for Electrophoretic Display>>

The microcapsules for electrophoretic display according to the present invention are used in a sheet for electrophoretic display by being supported on a substrate sheet. The sheet for electrophoretic display according to the present invention comprises: a substrate sheet having a substrate film and an electrically conductive layer formed on the substrate film; and a layer containing microcapsules for electrophoretic display according to the present invention, the microcapsules-containing layer being formed on the electrically conductive layer of the substrate sheet. When the sheet for electrophoretic display is used in an electrophoretic display device, the electrically conductive layer serves as one of the electrodes.

Figure 2:
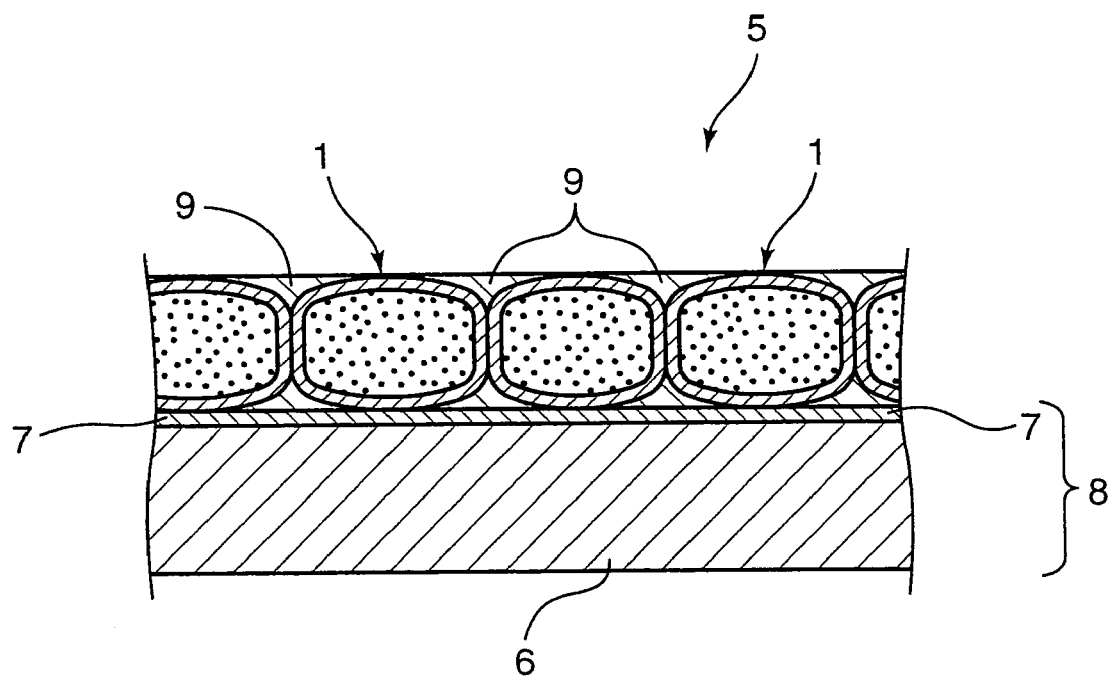
FIG. 2 is a schematic cross-sectional view showing one example of the sheet for electrophoretic display according to the present invention.

FIG. 2 is a schematic cross-sectional view showing one example of a sheet for electrophoretic display used in a one particle-based electrophoretic display device, which sheet is included in the sheet for electrophoretic display according to the present invention. In the sheet 5 for electrophoretic display, a layer containing microcapsules 1, 1, . . . , and 1 is formed on the electrically conductive layer 7 of substrate sheet 8 in which the electrically conductive layer 7 is formed on the substrate film 6. In this example, the microcapsules 1, 1, . . . , 1 are firmly fixed on the electrically conductive layer 7 of the substrate sheet 8 using binder 9. The shape of the microcapsules 1, 1, . . . , 1 may be of a particulate shape such as a spherical shape at the time of production and, after supported on the substrate sheet 8, the shape may be deformed as shown, for example, in FIG. 2.

In the sheet for electrophoretic display according to the present invention, a layer containing microcapsules (hereinafter referred to as the "microcapsule layer" in some cases) is formed on a substrate sheet. Further, a release film may be attached to the microcapsule layer. Depending on their use or purpose, the microcapsules may be supported in a monolayer or a multilayer, or may be supported discretely or densely, by the appropriate selection of a coating apparatus and coating conditions.

The microcapsules can be supported substantially in a monolayer and substantially densely on a substrate sheet. As used herein, the term "substantially in a monolayer" means that one microcapsule is supported and two or more microcapsules are not overlaid in the thickness direction of a substrate sheet. For example, so far as the desired function is not damaged, parts of adjacent microcapsules may slightly be overlaid. On the other hand, the term "substantially densely" means that microcapsules are supported in the closest packed state without a gap in the surface direction of a substrate sheet. In this case, it is not problematic that some local space is formed between the adjacent microcapsules depending on the planar shape of the microcapsules. In addition, so far as the desired function is not damaged, the strict closest packed state is not necessary to be achieved.

The thickness of a microcapsule layer, although it is not particularly limited because it may vary depending on the average particle diameter of microcapsules, may preferably have a lower limit of 10 μm, more preferably 16 μm, still more preferably 20 μm, and an upper limit of 250 μm, more preferably 180 μm, still more preferably 120 μm. If the thickness of a microcapsule layer is smaller than 10 μm, when the sheet for electrophoretic display is used in an electrophoretic display, a sufficient display concentration cannot be obtained at a display part, and the display part cannot clearly be distinguished from the other non-display part. In contrast, if the thickness of a microcapsule layer is greater than 250 μm, when the sheet for electrophoretic display is used in an electrophoretic display device, electrophoretic particles in a dispersion encapsulated in the microcapsules cannot exhibit sufficient electrophoretic properties, so that display properties such as contrast may be deteriorated and a driving voltage for displaying may be raised.

The substrate sheet has an electrically conductive layer formed on a substrate film, and serves to support microcapsules on the electrically conductive layer. The substrate sheet may preferably have transparency and electrical conductivity and, for example, there may be used a transparent electrically conductive film in which an electrically conductive layer is formed on the surface of a transparent plastic film. The substrate sheet may preferably have, for example, a transmittance of 80% or higher, and a surface electric resistance of 1,000 Ω or lower. When the transmittance of a substrate sheet is lower than 80%, contrast may be reduced, so that display may become unclear. When the surface electric resistance of a substrate sheet is higher than 1,000 Ω, the rapid migration of electrophoretic particles may become difficult at a part to which a voltage is applied for displaying, so that their speed of response (display responsiveness) may be reduced.

However, in the production of an electrophoretic display device, if another substrate sheet to be attached to a sheet for electrophoretic display is transparent, a substrate sheet used in the sheet for electrophoretic display need not necessarily to be transparent.

Examples of the material for a substrate film forming a substrate sheet may include acrylic resins, polyester resins, polyolefin resins, polycarbonate resins, and polyimide resins. In these resins, preferred are polyester resins, and particularly preferred is polyethylene terephthalate (PET).

Examples of the material for an electrically conductive layer to be formed on a substrate film may include inorganic electrically conductive materials such as indiumtinoxide (ITO), zinc oxide, metal fine particles, and metal foils, and organic electrically conductive materials such as polyacetylene, polyaniline, polypyrrole, polyethylenedioxythiophene, and polythiophene.

Examples of the method of forming an electrically conductive layer on a substrate film may include dry coating methods such as vacuum deposition and sputtering, and wet coating methods of coating a dispersion or a solution of an electrically conductive material.

The thickness of a substrate sheet, although it is not particularly limited, may preferably be 20 to 200 μm. When the thickness of a substrate sheet is smaller than 20 μm, creases may easily occur. In contrast, when the thickness of a substrate sheet is higher than 200 μm, the winding diameter of a wound roll of the sheet for electrophoretic display may become great, so that handling may become difficult, and the amount of a waste after use may be increased.

The substrate sheet may have an adhesive layer formed on the surface of an electrically conductive layer on which side a microcapsule layer is formed. When an adhesive layer is formed on a substrate sheet, microcapsules can effectively be supported on the substrate sheet. In addition, the microcapsules can be supported substantially in a monolayer and substantially densely, so that the microcapsules supported on the substrate sheet cannot easily be detached.

The material of an adhesive layer may appropriately be selected depending on the material of capsule shells forming microcapsules, although it is not particularly limited, and for example, there can be used water-soluble or water-dispersible or emulsifiable resins such as polyester resins, acrylic resins, epoxy resins, urethane resins, oxazoline resins, PVP resins, polyoxyalkylene resins, and cellulose resins. The formation of an adhesive layer can be carried out by any of the previously known coating techniques.

The process for producing a sheet for electrophoretic display according to the present invention may preferably be, for example, a process comprising the steps of: preparing a coating solution containing microcapsules dispersed in an aqueous medium; coating the solution on a substrate sheet; and drying the solution to form a layer containing the microcapsules on the substrate sheet.

Examples of the aqueous medium in which microcapsules are to be dispersed may include those aqueous mediums listed above as an aqueous medium used in the production of microcapsules.

The amount of microcapsules to be contained in a coating solution, although it is not particularly limited, may preferably have a lower limit of 25% by weight, more preferably 30% by weight, still more preferably 35 by weight, and an upper limit of 70% by weight, more preferably 60% by weight, still more preferably 50% by mass. When the amount of microcapsules to be contained is lower than 25% by weight, gaps without microcapsules may be produced in a coated film, so that it may become a cause for display defects when the sheet for electrophoretic display is used in an electrophoretic display device. In contrast, when the amount of microcapsules to be contained is higher than 70% by weight, microcapsules may easily be aggregated and the flowability of a coating solution may be reduced, so that coating may become difficult.

The viscosity of a coating solution, although it is not particularly limited, may preferably have, at ordinary temperature, a lower limit of 0.5 Pa·s, more preferably 0.7 Pa·s, still more preferably 0.8 Pa·s, and an upper limit of 10 Pa·s, more preferably 8 Pa·s, still more preferably 6 Pa·s. When the viscosity of a coating solution is lower than 0.5 Pa·s, the coating solution may have high flowability, so that it may become difficult to coat the coating solution in a desired thickness. In contrast, when the viscosity of a coating solution is higher than 10 Pa·s, the coating solution may have low flowability, so that the coating may become difficult.

The coating solution may contain, in addition to microcapsules, if necessary, various additives such as dispersants, viscosity modifiers, preservatives, and anti-foaming agents. When the bonding force between the microcapsules and the substrate sheet is deficient, binders can be used. When additives or binders are added to a coating solution, the amounts of the additives or binders to be used are not particularly limited, so far as coating on a substrate sheet cannot be inhibited and the effect of using the additives or binders can be obtained.

As a binder to be added to a coating solution, for example, preferred are organic binders. Examples of the organic binder may include synthetic resin binders such as acrylic resins, polyester resins, fluorine resins, alkyd resins, amino resins, vinyl resins, epoxy resins, polyamide resins, polyurethane resins, unsaturated polyester resins, phenol resins, polyolefin resins, silicone resins, acryl-silicone resins, xylene resins, ketone resins, rosin-modified maleic acid resins, liquid polybutadiene resins, and coumarone resins; natural or synthetic rubber binders such as ethylene-propylene copolymer rubbers, polybutadiene rubbers, styrene-butadiene rubbers, and acrylonitrile-butadiene copolymer rubbers; natural resin binders such as shellac, rosin (pine resin), ester gum, cured rosin, decolored shellac, and white shellac; thermoplastic or thermosetting polymer binders such as cellulose nitrate, cellulose acetate butylate, cellulose acetate, ethylcellulose, hydroxypropylmethylcellulose, and hydroxyethylcellulose. The synthetic resin binders may be plastic (thermoplastic) binders, or curable (including thermosetting, ultraviolet ray curable, electron beam curable, moisture curable, and their combined use) binders such as acrylic resins, methacrylic resins, and epoxy resins. These organic binders may be used alone, or two or more kinds of them may be used in combination.

The form of a binder may be of the solvent-soluble type, water-soluble type, emulsion type, and dispersion type (in any solvents such as water/organic solvents).

Examples of the water-soluble binder may include water-soluble alkyd resins, water-soluble acrylic-modified alkyl resins, water-soluble oil free alkyd resins (water-soluble polyester resins), water-soluble acrylic resins, water-soluble epoxyester resins, and water-soluble melamine resins.

Examples of the emulsion-type binder may include (meth) acrylic acid alkyl copolymer dispersions, vinyl acetate resin emulsions, vinyl acetate copolymer resin emulsions, ethylene-vinyl acetate copolymer resin emulsions, acrylic acid ester (co)polymer resin emulsions, styrene-acrylic acid ester (co) polymer resin emulsions, epoxy resin emulsions, urethane resin emulsions, acrylic-silicone emulsions, and fluorine resin emulsions.

Examples of the dispersant to be added to a coating solution may include polyacrylic acid salts; styrene-maleic acid copolymer salts; formalin condensates of naphthalenesulfonic acid salts; long chain alkyl organic sulfonic acid salts; polyphosphoric acid salts; long chain alkylamine salts; polyalkylene oxides; polyoxyalkylene alkyl ethers; sorbitan fatty acid esters; fluorine surfactants such as perfluoroalkyl group-containing salts, perfluoroalkyl group-containing esters, and perfluoroalkyl group-containing oligomers; non-ionic surfactants such as acetylenediols and acetylene glycols. These dispersants may be used alone, or two or more kinds of them may be used in combination.

Examples of the viscosity modifier to be added to a coating solution may include cellulose viscosity modifiers such as carboxymethylcellulose, methylcellulose, and hydroxyethylcellulose; polycarboxylic acid viscosity modifiers such as sodium polyacrylates, alkali-soluble emulsions, and association-type alkali-soluble emulsions; polyethylene glycol viscosity modifiers such as polyethylene glycol, polyethylene glycol alkyl ether, polyethylene glycol alkyl ester, and association-type polyethylene glycol derivatives; other water-soluble polymer viscosity modifiers such as polyvinyl alcohol; and smectite viscosity modifiers such as montmorillonite, hectorite, and saponite. These viscosity modifiers may be used alone, or two or more kinds of them may be used in combination.

Examples of the preservative to be added to a coating solution may include organic nitrogen sulfur compounds, organic nitrogen halogen compounds, chlorohexidine salts, cresol compounds, bromo compounds, aldehyde compounds, benzimidazole compounds, halogenated cyclic sulfur compounds, organic arsenic compounds, organic copper compounds, isothiazolone chloride, and isothiazolone. These preservatives may be used alone, or two or more kinds of them may be used in combination.

Examples of the anti-foaming agent to be added to a coating solution may include silicone anti-forming agents, Pluronic-type anti-foaming agents, mineral oil anti-foaming agents, polyester anti-foaming agents, and polyether anti-foaming agents. These anti-foaming agents may be used alone, or two or more kinds of them may be used in combination.

As a method of coating a coating solution on a substrate sheet, any of the previously known microcapsule coating techniques may be used, which is not particularly limited. Examples thereof may include a method of coating every substrate sheet using an applicator or blade coater, and a method of continuously coating on a substrate sheet using a continuous coating machine such as a multi coater. The coating conditions, although they are not particularly limited, may appropriately be set depending on the viscosity of a coating solution, the thickness of a coated film, the drying conditions after coating, and the like. For example, the coating speed, although it is not particularly limited, may preferably have a lower limit of 0.1 m/min, more preferably 0.2 m/min, and an upper limit of 10 m/min, more preferably 8 m/min.

As a drying method after coating, any of the previously known drying techniques may be used, which is not particularly limited. The drying conditions, although they are not particularly limited, may appropriately be set depending on the viscosity of a coating solution, the area of a coated film, and the like. For example, the drying temperature, although it is not particularly limited, may preferably have a lower limit of 15° C., more preferably 20° C., and an upper limit of 150° C., more preferably 120° C. The drying time, although it is not particularly limited, may preferably have a lower limit of 1 minute, more preferably 5 minutes, and an upper limit of 60 minutes, more preferably 45 minutes.

<<Electrophoretic Display Device>>

The sheet for electrophoretic display according to the present invention can be used in an electrophoretic display device, for example, as a constitutional element of a data display part. The electrophoretic display device of the present invention is an electrophoretic display device comprising a data display part, wherein the data display part comprises the sheet for electrophoretic display of the invention. The electrophoretic display device of the present invention is the same as any of the previously known electrophoretic display devices, except that the data display part comprises the sheet for electrophoretic display of the present invention. For this reason, parts other than the data display part, such as a driver circuit and a power supply circuit, may be formed as in any of the previously known electrophoretic display devices. That is, the electrophoretic display device of the present invention can be obtained by forming the data display part of any of the previously known electrophoretic display devices with the sheet for electrophoretic display of the present invention. In the present invention, a driver circuit and a power supply circuit may be incorporated in the external circuit, in which case only the data display part may be referred to as the electrophoretic display device.

The electrophoretic display device of the present invention, when there are used electrophoretic particles having either a positive zeta potential or a negative zeta potential exhibited by their dispersion when dispersed in a dispersing medium, is a one-particle-type electrophoretic display device and, when there is used a combination of electrophoretic particles having a positive zeta potential exhibited by their dispersion when dispersed in a dispersing medium and electrophoretic particles having a negative zeta potential exhibited by their dispersion when dispersed in a dispersing medium, is a two-particle-type electrophoretic display device.

In the production of an electrophoretic display device of the present invention, for example, when a sheet for electrophoretic display is in the form of a wound roll, the sheet is unwound, cut into a prescribed size, as such, or when a release film has been attached, the release film is removed, and another substrate sheet in which an electrically conductive layer is formed on a substrate film may be attached, for example, by a laminating technique. In this case, the electrically conductive layer of another substrate sheet may be made opposite to the microcapsule layer, so that the electrically conductive layer of another substrate sheet serves as the other electrode in an electrophoretic display device. In addition, when a driver layer consisting of film transistors using amorphous silicone or polysilicone, or organic transistors using organic molecules is provided on another substrate sheet, display can be controlled. Alternatively, the renewing of data may be carried out by an external device without formation of a driving layer. The display controlling means, although it is not particularly limited, may appropriately be selected depending on the use of an electrophoretic display device.

When another substrate sheet is laminated on a sheet for electrophoretic display, the procedure and conditions of laminating can appropriately be selected and used from the previously known techniques. In this case, in order to obtain an electrophoretic display device which can stably exhibit extremely excellent display properties, in general, the microcapsule layer may preferably be allowed to sufficiently adhere to the substrate sheet (increase their contact area). When the adhesiveness to the substrate sheet is low, display properties such as display responsiveness and contrast may be deteriorated. In order to enhance adhesiveness, for example, the elevation of a temperature and a pressure at the time of laminating can be considered. On the other hand, regarding microcapsules, the adhesiveness to the substrate sheet can further be enhanced by appropriately adjusting the amount of a capsule shell raw material to be used for the enhancement of their flexibility and adhesion properties. The use of this method makes it possible to obtain sufficient adhesiveness, even when conditions such as a temperature and a pressure at the time of laminating are made mild at some level.

An electrophoretic display device can be obtained by forming a data display part with the laminated sheet for electrophoretic display, and incorporating other constituent parts such as a driver circuit and a power supply circuit. Alternatively, a driver circuit and a power supply circuit may be incorporated in the external circuit, and only the data display part formed with the laminated sheet for electrophoretic display may be used as an electrophoretic display device.

In the electrophoretic display device of the present invention, an interval of the electrically conductive layers of the substrate sheets, that is, an interval between the opposite electrodes, although it is not particularly limited, may preferably have a lower limit of 10 μm, more preferably 15 μm, still more preferably 20 μm, and an upper limit of 120 μm, more preferably 80 μm, still more preferably 60 μm. When an interval between the opposite electrodes is smaller than 10 μm, a sufficient display concentration cannot be obtained at a display part, and the display part cannot clearly be distinguished from the other non-display part. In contrast, when an interval between the opposite electrodes is greater than 120 μm, electrophoretic particles in a dispersion encapsulated in the microcapsule cannot exhibit sufficient electrophoretic properties, so that display properties such as contrast may be deteriorated and a driving voltage for displaying may be raised.

In the electrophoretic display device of the present invention, for example, when pigment particles forming electrophoretic particles are white pigment particles, and a dispersing medium is colored with a blue dye, the initial display is pale blue, but when a voltage is applied between the opposite electrodes, the electrophoretic particles migrate toward the direction of one electrode, resulting in white display or blue display. When the polarity of a voltage is reversed, the electrophoretic particles migrate toward the direction of the other electrode, so that the white display or blue display is reversed to blue display or white display. When the polarity of a voltage is reversed again and the voltage is applied for an extremely short time, the display is returned to pale blue. Alternatively, when blue display or white display is, as such, allowed to stand without applying a voltage, the display may be kept for a long time to record it. In order to display or record character data or image data, for example, the electrode positioned at the-back of a device is kept as a prescribed standard potential (e.g., 0 V), a driver layer is provided at the electrode positioned on the surface of a device, thereby, the potential at each position on the display surface may be positive or negative relative to the standard potential corresponding to the color of the data (in this case, blue or white). The electrophoretic display device based on such an operation principle can be used for various electronic equipments comprising data display means.

<<Electronic Equipments>>

The electronic display device of the present invention can be used, for example, as a data displaying means, for electronic equipments. The electronic equipments of the present invention are those comprising data displaying means, wherein each of the data display means comprises the electrophoretic display device of the present invention. As used herein, the term "data displaying means" refers to a means for displaying character data or image data. The electronic equipments of the present invention are the same as the previously known electronic equipments, except that each of the data display means is the electrophoretic display device of the present invention. For this reason, parts other than the data displaying means may be formed as those in the previously known electronic equipments. In other words, the electronic equipments of the present invention can be obtained by the replacement of the data displaying means in the previously known electronic equipments with the electronic display device of the present invention.

Electronic equipments to which the electronic display device of the present invention can be applied are not particularly limited, so far as each of them comprises a data displaying means. Examples thereof may include personal computers, work stations, word processors, IC cards, IC tags, electronic notepads, electronic dictionary, IC recorders, electronic books, electronic papers, electronic notebooks, electric desktop calculators, electronic newspapers, electronic white boards, direction boards, advertisement boards, various displays, TV sets, DVD players, digital still cameras, view finder-type or monitor direct view-type video cameras, car navigation systems, mobile phones, videophones, pagers, mobile terminals, POS terminals, and various equipments having touch panels. These electronic equipments have previously been known, from which the electronic equipments of the present invention can be obtained by the replacement of the data displaying means with the electrophoretic display device of the present invention.

EXAMPLES

The present invention will be described below more specifically by way of the following Examples; however, the present invention is not restricted by these Examples. The present invention can also be practiced after appropriate alternation or modification in such a range that the above- or below-mentioned gist is not deviated, and all of them are included in the technical scope of the present invention. In the following, the term "liter" may be abbreviated as "L" in some cases and the term "% by weight" may be abbreviated as "% " in some cases.

The measurement methods and evaluation methods used in the following Examples and Comparative Examples will be explained below.

<Polymer Addition Rate>

The term "polymer addition rate" refers to the weight ratio of a polymer layer to an electrophoretic particle. The polymer addition rate was determined by the measurement of the ratio (% by weight) of a decrease in the weight of an electrophoretic particle when the temperature was raised from 100° C. to 500° C. under an air atmosphere at a temperature rising rate of 10° C./min using a thermal analyzing apparatus (trade name: TGA-50H, available from Shimadzu Corporation).

<Average Thickness of Polymer Layer>

Several electrophoretic particles were observed with a transmission electron microscope (TEM), and the resulting TEM images were subjected to the EDX spectrum analysis to determine the thicknesses at five parts chosen at random in a polymer layer. The average value of the thicknesses of several electrophoretic particles was regarded as the average thickness of the polymer layer.

<Density of Polymer Layer>

The same polymer as a polymer forming a polymer layer of an electrophoretic particle was synthesized by the following method, and measured for its density to determine the density of the polymer layer.

First, monomer components and a coupling agent having a polymerizable reactive group were mixed at the same ratio as used in Examples 1, 2, or 3, or Comparative Example 1 or 2 to obtain 50 g of a monomer mixture. In this mixture was dissolved 1.5 g of 2,2'-azobis(2-methylbutylonitrile) (trade name: ABN-E, available from Japan Hydrazine Co., Inc.) to prepare a mixture for dropwise addition.

A four-neck flask with a volume of 200 mL was charged with 50 g of toluene, which was heated to 100° C., and the mixture for addition dropwise obtained above was continuously added dropwise over 2 hours under a nitrogen atmosphere, after which the mixture was kept at the same temperature for 1 hour. Then, 0.1 g of 2,2'-azobis(2-methylbutylonitrile) was added, and the mixture was further kept at the same temperature for 2 hours, which was cooled to prepare a polymer solution. The solvent component in this polymer solution was evaporated by heating and drying to obtain a powdery polymer.

The density of this powdery polymer was measured with a true density measuring device (trade name: ULTRAPICNOMETER 1000, available from Yuasa Ionics Inc.) and the resulting value was employed as the density of the polymer layer.

<Polymer Coating Rate>

The term "polymer coating rate" refers to the coating ratio of a polymer layer on the surface of a pigment particle. The polymer coating rate was determined by the following calculating formula:

$$Pc = [(Pa \times 1000)/((100-Pa) \times Pd \times Pt \times S)] \times 100$$

wherein Pc represents the polymer coating rate (%); Pa, the polymer addition rate (%); Pd, the density of a polymer layer (g/cm$^3$); Pt, the average thickness of the polymer layer (nm); and S, the specific surface area of a pigment particle (m$^2$/g).

<Display Responsiveness>

A direct current voltage of 15 V was applied between the opposite electrodes of an electrophoretic display device to provide blue display, after which display responsiveness (time necessary for reverse display (white display)) at the time of switching the polarity of the voltage was evaluated by the following criteria. The observation was carried out by naked eyes using an optical microscope. White display is derived from the color of a pigment particle forming an electrophoretic particle, and blue display is derived from the color of a dye coloring a dispersing medium. In the following, the same also holds in other evaluations.

High: shorter than 2 seconds;

Medium: not shorter than 2 seconds, and shorter than 4 seconds; and

Low: not shorter than 4 seconds.

<Display Stability>

A direct current voltage of 15 V was applied between the opposite electrodes of an electrophoretic display device to provide white display, after which display stability (time for keeping white display) when the voltage was off was evaluated by the following criteria. The observation was carried out by naked eyes using an optical microscope.

High: not shorter than (24×7) hours;

Medium: not shorter than 24 hours, and shorter than (24×7) hours; and

Low: shorter than 24 hours.

<Contrast>

A direct current voltage of 15 V was applied between the opposite electrodes of an electrophoretic display device to provide white display or blue display, after which the reflectivity of each display was measured with a Macbeth spectroscopic densitometer (trade name: SPECTRO EYE, available from Grotag Macheth), and contrast was determined by the following formula.

Contrast=reflectivity of white display/reflectivity of blue display

The reflectivities of white display and blue display were measured separately by the addition of a voltage, of which polarity was switched, and each reflectivity is the average value of measurements over the whole one side of an electrophoretic display device.

<Contrast After Environmental Test>

The contrast after the environmental test was determined in the same manner as used in the evaluation method for contrast, except that the electrophoretic display device was stored at 60° C. for 3 hours at 90% RH and then allowed to stand at room temperature for 1 hour, followed by the measurement of contrast.

Example 1

<Production of Electrophoretic Particles>

A separable four-neck flask with a volume of 400 mL, equipped with a stirring wing, was charged with 30 g of titanium oxide particles (trade name: TIPAQUE CR-90, available from Ishihara Sangyo Kaisha, Ltd.; average particle diameter, 0.25 μm; specific surface area, 13 m$^2$/g) as pigment particles, 93 g of ethanol, 23 g of water, 1 g of 25 wt % aqueous ammonia, 0.3 g of γ-methacryloxypropyltolymethoxysilane (trade name: KBM-503, available from Shin-Etsu Chemical Co., Ltd.) as a coupling agent having a polymerizable reactive group, and 0.8 g of a 38 wt % methanol solution of octadecyldimethyl[3-(tolymethoxysilyl)propyl]ammonium chloride (trade name: LS-6985, available from Shin-Etsu Chemical Co., Ltd.). This flask was placed in an ultrasound bath (trade name: BRANSON5210, available from Yamato Scientific Co., Ltd.), in which ultrasound dispersing treatment was carried out for 2 hours while stirring.

After the dispersing treatment, the flask was removed from the bath. While the content of the flask was stirred under a nitrogen atmosphere, there was added a mixed solution containing 0.1 g of methacrylic acid and 0.5 g of lauryl methacrylate as monomer components, followed by heating. At the time when the temperature reached 70° C., 0.4 g of a 10 wt % aqueous ammonium persulfate solution was added, and the mixture was kept at 70° C. for 3 hours, thereby carrying out the polymerization reaction.

The total amount of the polymerization reaction solution was placed into a centrifugal sedimentation tube, which was centrifuged at 10,000 G for 15 minutes to recover a supernatant and a settled substance (titanium oxide particles each having a polymer layer), separately.

The supernatant was dried at 120° C. for 2 hours, and the concentration of nonvolatile components was measured, thereby obtaining the amount of solids in the solvent. This amount of solids was regarded as the amount of a polymer produced in the solvent in the polymerization reaction, that is, the amount of a polymer failing to coat the surface of each of the pigment particles (titanium oxide particles). From this amount of a polymer, and the total amount of monomer components and a coupling agent having a polymerizable group, the polymerization rate of monomer components corresponding to a polymer synthesized only in the solvent (i.e., polymerization rate in a solvent) was determined. The results are shown in Table 1.

The settled substance was dispersed in 120 g of methanol, which was centrifuged at 10,000 G for 15 minutes. The supernatant was discarded, and only the settled substance was recovered. There was carried out the washing step of repeating, two more times, this procedure of dispersing, centrifugation, and recovering only a settled substance, and the settled substance finally recovered was dried at 80° C. for 2 hours, thereby obtaining 30 g of electrophoretic particles (1) in which a polymer layer was formed on the surface of each of the titanium oxide particles.

Regarding the electrophoretic particles (1), the polymer addition rate was measured by the above method and, from this addition rate, and the total amount of the resulting electrophoretic particles (1), the amount of a polymer coating the surface of each of the titanium oxide particles was determined. From this amount of a polymer, and the total amount of monomer components and a coupling agent having a polymerizable group, the polymerization rate of monomer components corresponding to a polymer synthesized so that the surface of each of the titanium oxide particles was coated (i.e., polymerization rate of a coating material) was determined. Further, from the total sum of this polymerization rate of a coating material and the polymerization rate in a solvent, the polymerization rate of all monomer components corresponding to all the polymers synthesized (i.e. the total polymerization rate) was obtained. The results are shown in Table 1.

Figure 3:
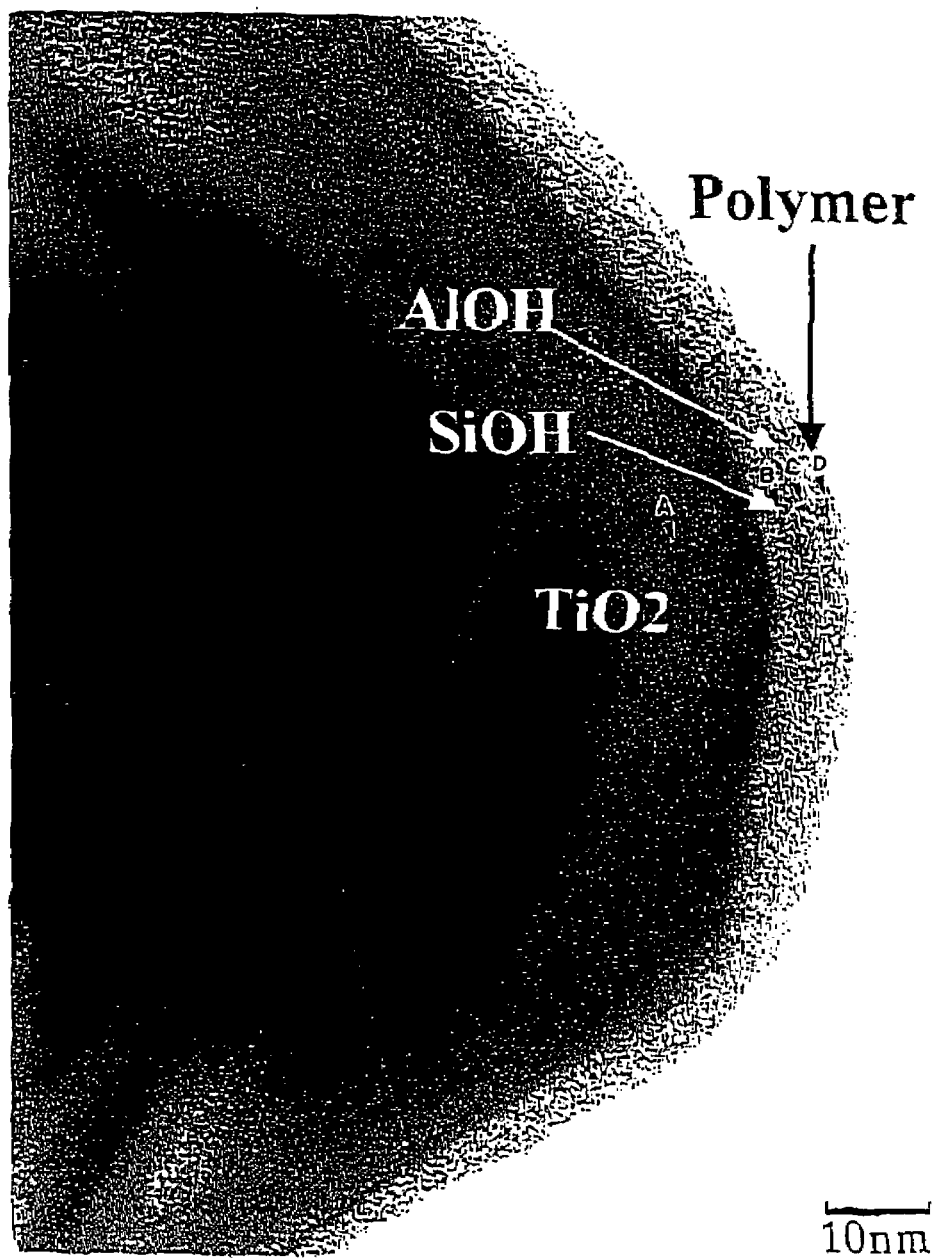
FIG. 3 is a photograph in substitution for a drawing, showing a TEM image of one example of the electrophoretic particle of the present invention.

The electrophoretic particles (1) were observed with a transmission electron microscope (TEM), and the resulting TEM images were subjected to the EDX spectrum analysis. As a result, it was confirmed that a polymer layer was formed on the surface of each of the titanium oxide particles. The surface of each of the titanium oxide particles was almost discontinuously coated with the polymer layer, and the average thickness of the polymer layer was 3 nm. FIG. 3 is a photograph in substitution for a drawing, showing the TEM image of one of the electrophoretic particles (1). In addition, regarding the electrophoretic particles (1), the density of the polymer layer was measured, and the polymer coating rate was determined. The results are shown in Table 2.

<Production of Dispersion for Electrophoretic Display>

First, 14.2 g of the electrophoretic particles (1) and 88 g of dodecylbenzene were subjected to dispersing treatment for 15 minutes with an ultrasound homogenizer (trade name: FUS-600-1C, available from Nippon Seiki Seisakusho Co., Ltd.), in which 1.8 g of a blue dye (trade name: OIL BLUE F, available from Chuo Synthetic Chemical Co., Ltd.) was dissolved, thereby obtaining dispersion (1) for electrophoretic display. The zeta potential of this dispersion (1) was measured with a zeta potential measuring device (trade name: ESA-9800, available from Matec Applied Sciences), and it was found to be 52 mV in absolute value. The results are shown in Table 2.

Example 2

<Production of Electrophoretic Particles>

The same flask as used in Example 1 was charged with 30 g of titanium oxide particles (trade name: TIPAQUE CR-90, available from Ishihara Sangyo Kaisha, Ltd.; average particle diameter, 0.25 μm; specific surface area, 13 m$^2$/g) as pigment particles, 93 g of ethanol, 23 g of water, 1 g of 25 wt % aqueous ammonia, 0.6 g of γ-methacryloxypropyltolymethoxysilane (trade name: KBM-503, available from Shin-Etsu Chemical Co., Ltd.) as a coupling agent having a polymerizable reactive group, and 2.4 g of a 38 wt % methanol solution of octadecyldimethyl[3-(trimethoxysilyl)propyl]ammonium chloride (trade name: LS-6985, available from Shin-Etsu Chemical Co., Ltd.). This flask was placed in 50° C. ultrasound bath (trade name: BRANSON5210, available from Yamato Scientific Co, Ltd.), in which ultrasound dispersing treatment was carried out for 2 hours while stirring.

After the dispersing treatment, the flask was removed from the bath. While the content of the flask was stirred under a nitrogen atmosphere, there was added a mixture of 0.6 g of methacrylic acid and 3 g of lauryl methacrylate as monomer components, followed by heating. At the time when the temperature reached 70° C., 1.5 g of a 10 wt % aqueous ammonium persulfate solution was added, and the mixture was kept at 70° C. for 3 hours, thereby carrying out the polymerization reaction.

The polymerization reaction solution was treated in the same manner as described in Example 1, thereby obtaining 31 g of electrophoretic particles (2). The total polymerization rate, the polymerization rate of coating material, and the polymerization rate in a solvent were determined in the same manner as described in Example 1. The results are shown in Table 1.

The electrophoretic particles (2) were observed with a transmission electron microscope (TEM), and the resulting TEM images were subjected to the EDX spectrum analysis. As a result, it was confirmed that a polymer layer was formed on the surface of each of titanium oxide particles. The surface of each of the titanium oxide particles was almost discontinuously coated with the polymer layer, and the average thickness of the polymer layer was 12 nm. In addition, regarding the electrophoretic particles (2), the density of the polymer layer was measured, and the polymer coating rate was determined. The results are shown in Table 2.

<Production of Dispersion for Electrophoretic Display>

In the same manner as described in Example 1, except that the electrophoretic particles (2) were used in place of the electrophoretic particles (1), dispersion (2) for electrophoretic display was obtained. The zeta potential of this dispersion (2) was measured as described in Example 1, and it was found to be 88 mV in absolute value. The results are shown in Table 2.

Example 3

<Production of Electrophoretic Particle>

The same flask as used in Example 1 was charged with 30 g of titanium oxide particles (trade name: TIPAQUECR-90, available from Ishihara Sangyo Kaisha Ltd.; average particle diameter, 0.25 μm; specific surface area, 13m²/g) as pigment particles, 108 g of isopropyl alcohol, 8 g of water, 4 g of a 25 wt % aqueous ammonia, and 1.2 g of γ-methacryloxypropyltrimethoxysilane (trade name: KBM-503, available from Shin-Etsu Chemical Co., Ltd.) as a coupling agent having a polymerizable reactive group. This flask was placed into a 50° C. ultrasound bath (trade name: BRANSON5210, available from Yamato Scientific Co., Ltd.), in which ultrasound dispersing treatment was carried out for 2 hours while stirring.

After the dispersing treatment, the flask was removed from the bath. While the content of the flask was stirred under a nitrogen atmosphere, there was added a mixture of 1.2 g of methacryloyloxyethyltrimethylammonium chloride and 4.8 g of lauryl methacrylate as monomer components, followed by heating. At the time point when the temperature reached 70° C., 1.5 g of a 10 wt % aqueous ammonium persulfate solution was added, and the mixture was kept at 70° C. for 3 hours, thereby carrying out the polymerization reaction.

The polymerization reaction solution was treated in the same manner as described in Example 1, thereby obtaining 32 g of electrophoretic particles (3). The total polymerization rate, the polymerization rate of a coating material, and the polymerization rate in a solvent were determined in the same manner as described in Example 1. The results are shown in Table 1.

The electrophoretic particles (3) were observed with a transmission electron microscope (TEM), and the resulting TEM images were subjected to the EDX spectrum analysis. As a result, it was confirmed that a polymer layer was formed on the surface of each of the titanium oxide particles. The surface of each of the titanium oxide particles was almost discontinuously coated with the polymer layer, and the average thickness of the polymer layer was 17 nm. In addition, regarding the electrophoretic particles (3), the density of the polymer layer was measured, and the polymer coating rate was determined. The results are shown in Table 2.

<Production of Dispersion for Electrophoretic Display>

In the same manner as described in Example 1, except that the electrophoretic particles (3) were used in place of the electrophoretic particles (1), dispersion (3) for electrophoretic display was obtained. The zeta potential of this dispersion (3) was measured as described in Example 1, and it was found to be 74 mV in absolute value. The results are shown in Table 2.

Comparative Example 1

<Production of Electrophoretic Particle>

The same flask as used in Example 1 was charged with 30 g of titanium oxide particles (trade name: TIPAQUECR-90, available from Ishihara Sangyo Kaisha Ltd.; average particle diameter, 0.25 μm,; specific surface area, 13 m²/g) as pigment particles, 93 g of isopropyl alcohol, 23 g of water, 1 g of a 25 wt % aqueous ammonia, 0.6 g of γ-methacryloxypropyltrimethoxysilane (trade name: KBM-503, available from Shin-Etsu Chemical Co., Ltd) as a coupling agent having a polymerizable reacting group, and 2.4 g of a 38 wt % methanol solution of octadecyldimethyl[3-(trimethoxysilyl)propyl]ammonium chloride (trade name: LS-6985, available from Shin-Etsu Chemical Co., Ltd). This flask was placed into a 50° C. ultrasound bath (trade name: BRANSON5210, available from Yamato Scientific Co., Ltd.), in which ultrasound dispersing treatment was carried out for 2 hours while stirring.

After the dispersing treatment, the flask was removed from the bath. While the content of the flask was stirred under a nitrogen atmosphere, there was added 3 g of lauryl methacrylate as a monomer component, followed by heating. At the time when the temperature reached 70° C., 0.1 g of 2,2'-azobis-(2,4-dimethylvaleronitrile) (trade name: ABN-V, available from Japan Hydrazine Co., Inc.), and the mixture was kept at 70° C. for 3 hours, thereby carrying out the polymerization reaction.

The polymerization reaction solution was treated in the same manner as described in Example 1, thereby obtaining 30 g of electrophoretic particles (c1). The total polymerization rate, the polymerization rate of a coating material, and the polymerization rate in a solvent were determined in the same manner as described in Example 1. The results are shown in Table 1.

The electrophoretic particles (c1) were observed with a transmission electron microscope (TEM), and the resulting TEM images were subjected to the EDX spectrum analysis. As a result, it was confirmed that a polymer layer was formed on the surface of each of the titanium oxide particles. However, the surface of each of the titanium oxide particles was partially coated with the polymer layer, and the coating amount was small. The average thickness of the polymer layer was 5 nm. In addition, regarding the electrophoretic particles (c1), the density of the polymer layer was measured, and the polymer coating rate was determined. The results are shown in Table 2.

<Production of Dispersion for Electrophoretic Display>

In the same manner as described in Example 1, except that the electrophoretic particles (c1) were used in place of the electrophoretic particles (1), dispersion (c1) for electrophoretic display was obtained. The zeta potential of this dispersion (c1) was measured as described in Example 1, and it was found to be 16 mV in absolute value. The results are shown in Table 2.

Comparative Example 2

In the same manner as described in Example 2, except that 2.4 g of γ-methacryloxypropyltrimethoxysilane was used as a coupling agent having a polymerizable reactive group and 1.8 g of methacrylic acid was used a monomer component, 30 g of electrophoretic particles (c2) was obtained. The total polymerization rate, the polymerization rate of a coating material, and the polymerization rate in a solvent were determined in the same manner as described in Example 1. The results are shown in Table 1.

The electrophoretic particles (c2) were observed with a transmission electron microscope (TEM), and the resulting TEM images were subjected to the EDX spectrum analysis. As a result, it was confirmed that a polymer layer was formed on the surface of each of the titanium oxide particles. However, the surface of each of the titanium oxide particles was partially coated with the polymer layer, and the coating amount was small. The average thickness of the polymer layer was 7 nm. In addition, regarding the electrophoretic particles (c2) the density of the polymer layer was measured, and the polymer coating rate was determined. The results are shown in Table 2.

<Production of Dispersion for Electrophoretic Display>

In the same manner as described in Example 1, except that the electrophoretic particles (c2) were used in place of the electrophoretic particles (1), dispersion (c2) for electrophoretic display was obtained. The zeta potential of this dispersion (c2) was measured as described in Example 1, and it was found to be 24 mV in absolute value. The results are shown in Table 2.

Example 4

<Production of Microcapsules for Electrophoretic Display>

A beaker with a volume of 300 mL was charged with 60 g of water, 4.4 g of gum arabic, and 6.6 g of gelatin, and these materials were dissolved, which was kept at 43° C. While this solution was stirred with a high speed dispersing machine (trade name: ROBOMICS, available from Tokushu Kika Kogyo Co., Ltd), 105 g of the dispersion (2) for electrophoretic display at 55° C. was added. The stirring speed was gradually increased, and the mixture was stirred at 1,200 rpm for 60 minutes, thereby obtaining a suspension.

While this suspension was diluted with 300 mL of warm water at 43° C., the stirring speed was gradually decreased. While this suspension was diluted with 300 mL of warm water at 43° C., the stirring speed was gradually decreased. At the time when the stirring speed became 500 rpm, 0.75 mL of a 10 wt % aqueous sodium carbonate solution was added, and the mixture was stirred at 500 rpm for 30 minutes. The following procedures were all carried out while stirring at 500 rpm.

Then, 11 mL of a 10 wt % aqueous acetic acid solution was quantitatively added over 25 minutes, and the mixture was cooled to a temperature of 10° C. or lower and kept at this temperature for 2 hours. After that, 3 mL of 37 wt % formalin was quantitatively added over 30 seconds, and 22 mL of a 10 wt % aqueous sodium carbonate solution was quantitatively added over 25 minutes.

After that, the temperature was raised to 25° C., at which temperature maturation was carried out 20 hours, followed by filtration, thereby obtaining microcapsules (1) for electrophoretic display.

The average particle diameter of the microcapsules (1) for electrophoretic display was measured with a laser scattering particle size distribution analyzer (trade name: LA-910, available from Horiba, Ltd.), and it was found to be 83 μm in volume average particle diameter. The results are shown in Table 3.

Example 5

<Production of Microcapsules for Electrophoretic Display>

In the same manner as described in Example 4, except that the dispersion (3) for electrophoretic display was used in place of the dispersion (2) for electrophoretic display, microcapsules (2) for electrophoretic display were obtained.

The average particle diameter of the microcapsules (2) for electrophoretic display was measured as described in Example 4, and it was found to be 87 μm in volume average particle diameter. The results are shown in Table 3.

Comparative Example 3

<Production of Microcapsules for Electrophoretic Display>

In the same manner as described in Example 4, except that the dispersion (c1) for electrophoretic display was used in place of the dispersion (2) for electrophoretic display, microcapsules (c1) for electrophoretic display were obtained.

The average particle diameter of the microcapsules (c1) for electrophoretic display was measured as described in Example 4, and it was found to be 95 μm in volume average particle diameter. The results are shown in Table 3.

Comparative Example 4

<Production of Microcapsules for Electrophoretic Display>

In the same manner as described in Example 4, except that the dispersion (c2) for electrophoretic display was used in place of the dispersion (2) for electrophoretic display, microcapsules (c2) for electrophoretic display were obtained.

The average particle diameter of the microcapsules (c2) for electrophoretic display was measured as described in Example 4, and it was found to be 89 μm in volume average particle diameter. The results are shown in Table 3.

Example 6

<Production of Sheet for Electrophoretic Display>

The microcapsules (1) for electrophoretic display and a binder resin (trade name: POLYMENT SK-1000, manufactured by Nippon Shokubai Co., Ltd.; concentration, 38% by weight) were mixed at the weight ratio of solids being equal to 10:1, and the mixture was diluted with water so that the concentration of solids became 35 wt %, thereby obtaining a coating solution containing the microcapsules for electrophoretic display.

This coating solution was coated on the ITO electrode of a PET film (thickness, 125 μm) with an ITO electrode using a 100 μm applicator, followed by drying at 90° C. for 10 minutes, thereby obtaining sheet (1) for electrophoretic display. The thickness of the microcapsule layer was measured with a film thickness meter (trade name: DIAL THICKNESS GAUGE, available from Ozaki MFG Co., Ltd.). The results are shown in Table 4.

<Production of Electrophoretic Display Device>

The sheet (1) for electrophoretic display was dried, and the ITO electrode surface of another PET film (thickness 125 μm) with an ITO electrode was laminated on its coated surface, thereby obtaining electrophoretic display device (1) in which the microcapsules (1) for electrophoretic display were arranged between the opposite electrodes. The lamination was carried out by passing the sheet between the rolls of a hot roll apparatus, which had been heated at 100° C., at a rate of 0.2 m/s.

Regarding the electrophoretic display device (1), display responsiveness, display stability, contrast, and contrast after an environmental test were evaluated. The results are shown in Table 4.

Example 7

<Production of Sheet for Electrophoretic Display>

In the same manner as described in Example 6, except that the microcapsules (2) for electrophoretic display were used in place of the microcapsules (1) for electrophoretic display, sheet (2) for electrophoretic display was obtained. The thickness of the microcapsule layer was measured with a film thickness meter (trade name: DIAL THICKNESS GAUGE, available from Ozaki MFG CO., Ltd.) The results are shown in Table 4.

<Production of Electrophoretic Display Device>

In the same manner as described in Example 6, except that the sheet (2) for electrophoretic display was used in place of the sheet (1) for electrophoretic display, electrophoretic display device (2) was obtained.

Regarding the electrophoretic display device (2), display responsiveness, display stability, contrast, and contrast after an environmental test were evaluated. The results are shown in Table 4.

film thickness meter (trade name: DIAL THICKNESS GAUGE, available from Ozaki MFG Co., Ltd.) The results are shown in Table 4.

<Production of Electrophoretic Display Device>

In the same manner as described in Example 6, except that the sheet (c2) for electrophoretic display was used in place of the sheet (1) for electrophoretic display, electrophoretic display device (c2) was obtained.

Regarding the electrophoretic display device (c2) display responsiveness, display stability, contrast, and contrast after an environmental test were evaluated. The results are shown in Table 4.

TABLE 1

| | Solvents | | Monomer components | | Polymerization rates (wt %) | | |
|---|---|---|---|---|---|---|---|
| | Water Organic solvents | Ratio of water to be added (wt %) | Conc. of monomer components (wt %) | Ratio of hydrophilic monomers to be added (wt %) | Total | Coating material | In a solvent |
| Example 1 | Water EtOH, MeOH | 20.5 | 0.5 | 16.7 | 94.8 | 89.9 | 4.9 |
| Example 2 | Water EtOH, MeOH | 19.2 | 2.9 | 16.7 | 94.7 | 90.5 | 4.2 |
| Example 3 | Water IPA, MeOH | 10.3 | 4.7 | 20.0 | 92.5 | 86.2 | 6.3 |
| Comp. Ex. 1 | Water IPA, MeOH | 20.1 | 2.5 | 0 | 76.1 | 11.3 | 64.8 |
| Comp. Ex. 2 | Water EtOH, MeOH | 19.2 | 4.0 | 37.5 | 77.7 | 16.4 | 61.3 |

Comparative Example 5

<Production of Sheet for Electrophoretic Display>

In the same manner as described in Example 6, except that the microcapsules (c1) for electrophoretic display were used in place of the microcapsules (1) for electrophoretic display, sheet (c1) for electrophoretic display was obtained. The thickness of the microcapsule layer was measured with a film thickness meter (trade name: DIAL THICKNESS GAUGE, available from Ozaki MFG Co., Ltd.) The results are shown in Table 4.

<Production of Electrophoretic Display Device>

In the same manner as described in Example 6, except that the sheet (c1) for electrophoretic display was used in place of the sheet (1) for electrophoretic display, electrophoretic display device (c1) was obtained.

Regarding the electrophoretic display device (c1) display responsiveness, display stability, contrast, and contrast after an environmental test were evaluated. The results are shown in Table 4.

Comparative Example 6

<Production of Sheet for Electrophoretic Display>

In the same manner as described in Example 6, except that the microcapsules (c2) for electrophoretic display were used in place of the microcapsules (1) for electrophoretic display, sheet (c2) for electrophoretic display was obtained. The thickness of the microcapsule layer was measured with a

TABLE 2

| | Average particle diameter of pigment particles (μm) | Average thickness of polymer layer (nm) | Polymer coating rate (%) | Zeta potential of dispersion (mV) |
|---|---|---|---|---|
| Example 1 | 0.25 | 3 | 92 | 52 |
| Example 2 | 0.25 | 12 | 99 | 88 |
| Example 3 | 0.25 | 17 | 94 | 74 |
| Comp. Ex. 1 | 0.25 | 5 | 26 | 16 |
| Comp. Ex. 2 | 0.25 | 7 | 41 | 24 |

As can be seen from Tables 1 and 2, the electrophoretic particles of Examples 1 to 3 having all of the average particle diameter of pigment particles, the average thickness of a polymer layer, and the polymer coating rate in the prescribed ranges had extremely high dispersiveness in a dispersing medium because the dispersions for electrophoretic display produced using these electrophoretic particles exhibited high absolute values of a zeta potential. In contrast, the electrophoretic particles of Comparative Examples 1 and 2 having the polymer coating rates outside the prescribed range had low dispersiveness in a dispersing medium because the dispersions for electrophoretic display produced using these electrophoretic particles exhibited low absolute values of a zeta potential.

In addition, in Examples 1 to 3 in which the procedure and conditions of dispersion polymerization were appropriately selected in the production of electrophoretic particles, the total polymerization rate was high, and the polymerization rate of a coating material was very higher than the polymerization rate in a solvent, and therefore, the monomer components were polymerized efficiently on the surface of each of the pigment particles to form a polymer layer. In contrast, in Comparative Examples 1 and 2 having the conditions of dispersion polymerization outside the prescribed range, the total polymerization rate was relatively low, and the polymerization rate in a solvent was higher than the polymerization rate of a coating material, and therefore, the monomer components were polymerized more efficiently in a solvent than on the surface of each of the pigment particles, and the particles made only of a polymer were formed.

TABLE 3

| | Electrophoretic dispersions | | | Microcapsules for electrophoretic display | |
| --- | --- | --- | --- | --- | --- |
| | Electrophoretic particles | | | | Average |
| | Pigment particles Average diameter (μm) | Polymer layer Hydrophilic monomer Hydrophobic monomer | Zeta potential (mV) | | particle diameter (μm) |
| Example 2 | Titanium oxide 0.25 | Acrylic polymer Methacrylic acid Lauryl methacrylate | 88 | Example 4 | 83 |
| Example 3 | Titanium oxide 0.25 | Acrylic polymer Methacryloyloxyethyl-trimethylammonium chloride Lauryl methacrylate | 74 | Example 5 | 87 |
| Comparative Example 1 | Titanium oxide 0.25 | Acrylic polymer - Lauryl methacrylate | 16 | Comparative Example 3 | 95 |
| Comparative Example 2 | Titanium oxide 0.25 | Acrylic polymer Methacrylic acid Lauryl methacrylate | 24 | Comparative Example 4 | 89 |

TABLE 4

| Sheets for electrophoretic display | Electrophoretic display devices | | | |
| --- | --- | --- | --- | --- |
| Thickness of microcapsule layer (μm) | Display responsiveness | Display stability | Contrast | Contrast after environmental test |
| Example 6 | 66 | High | High | 3.8 | 3.4 |
| Example 7 | 69 | High | High | 3.6 | 3.1 |
| Comparative Example 5 | 71 | Low | Medium | 1.9 | 1.1 |
| Comparative Example 6 | 69 | Medium | Medium | 2.2 | 1.4 |

As can be seen from Tables 3 and 4, the electrophoretic display devices of Example 6 and 7 had excellent display responsiveness and display stability, and have high contrast and contrast after an environmental test because the dispersions for electrophoretic display of Examples 2 and 3 used therein exhibited a zeta potential of 30 mV or higher in absolute value. In contrast, the electrophoretic display devices of Comparative Examples 5 and 6 had poor display responsiveness and display stability, and had low contrast and contrast after an environmental test because the dispersions for electrophoretic display of Comparative Examples 1 and 2 used therein exhibited a zeta potential of lower than 30 mV in absolute value.

Example 8

<Electronic Equipment>

Figure 4:
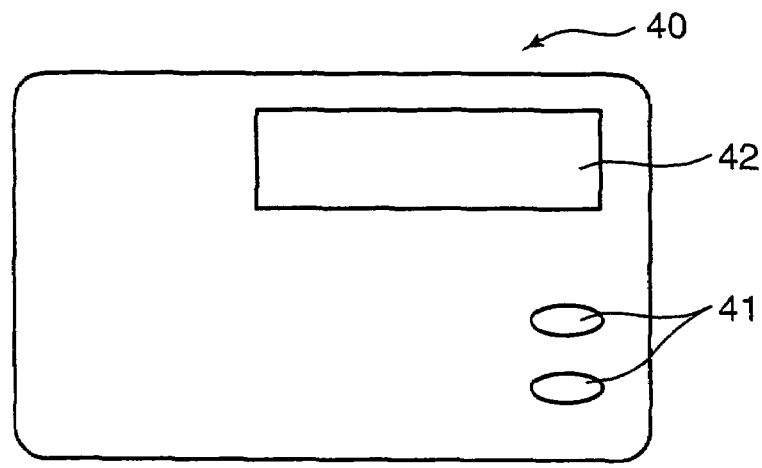
FIG. 4 is a plan view showing one example of an IC card which is one embodiment of the electronic equipment of the present invention.

FIG. 4 is a plan view showing one example of an IC card which is one embodiment of the electronic equipment of the present invention. IC card 40 has two operation buttons 41 and 41, and display panel 42. In the IC card 40, display panel 42 as a data displaying means is the electrophoretic display device of the present invention.

Example 9

<Electronic Equipment>

Figure 5:
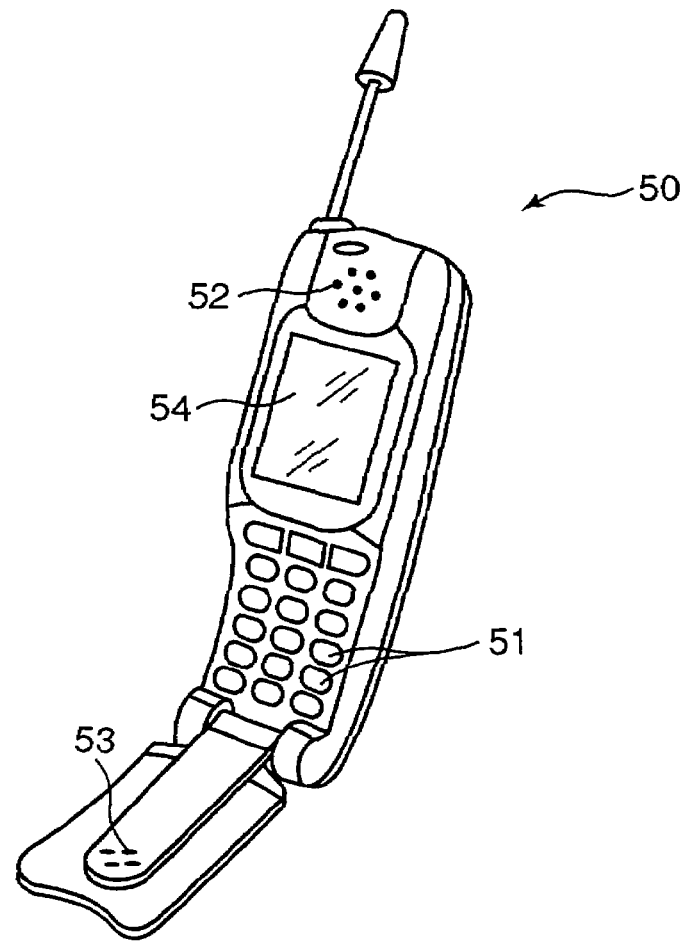
FIG. 5 is a perspective view showing one example of a mobile phone which is another embodiment of the electronic equipment of the present invention.

FIG. 5 is a perspective view showing one example of a mobile phone which is another embodiment of the electronic equipment of the present invention. Mobile phone 50 has two or more buttons 51, 51, . . . , and 51, earpiece 52, mouthpiece 53, and display panel 54. In the mobile phone 50, display panel 54 as a data displaying means is the electrophoretic display device of the present invention.

Example 10

<Electronic Equipment>

Figure 6:
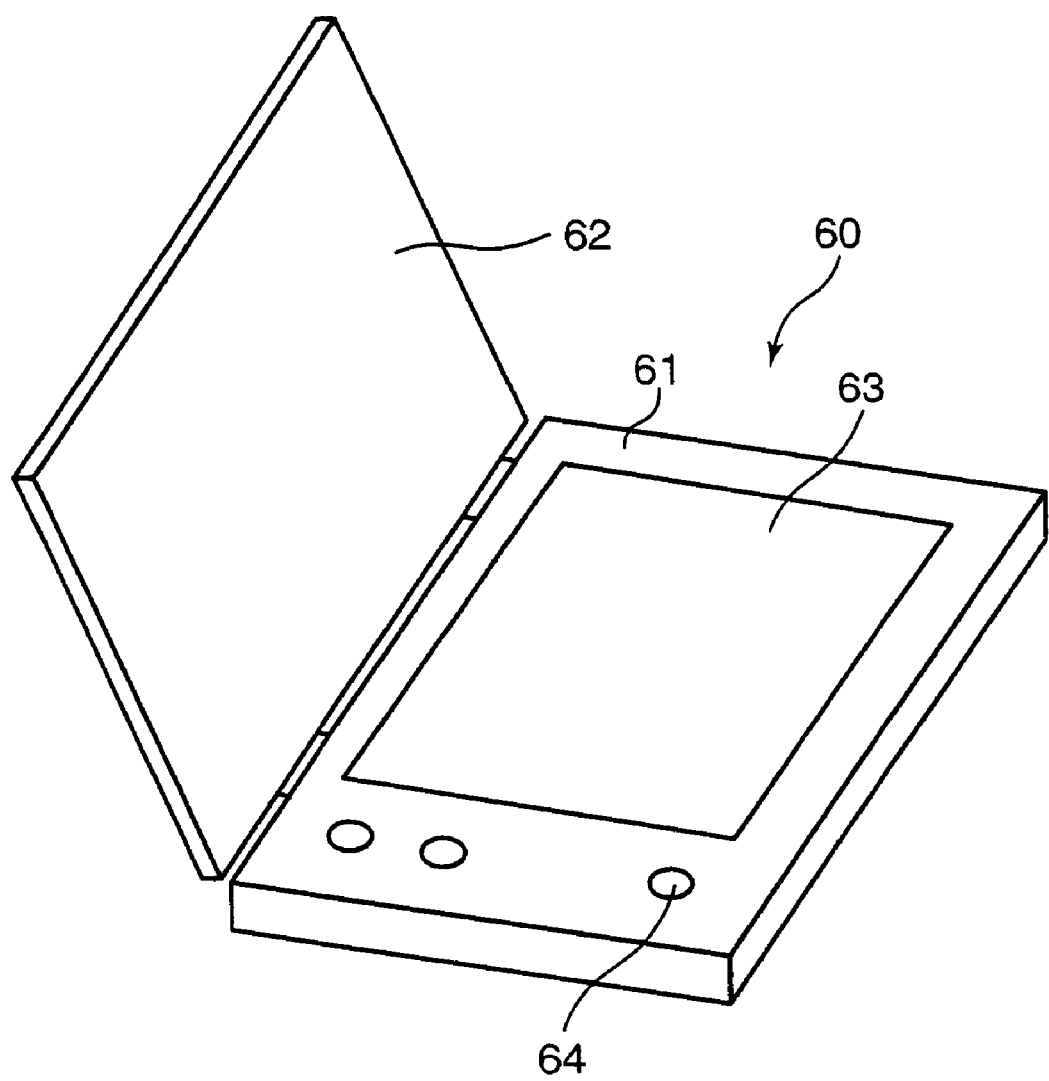
FIG. 6 is a perspective view showing one example of an electronic book which is still another embodiment of the electronic equipment of the present invention.

FIG. 6 is a perspective view showing one example of an electronic book which is still another embodiment of the electronic equipment of the present invention. Electronic book 60 has a book-shaped frame 61, and cover 62 which is provided rotatably relative to the frame 61 (openable and closable). Frame 61 has display device 63 in the state where the display surface is opened, and operating portion 64. In the electronic book 60, display device 63 as a data displaying means is the electrophoretic display device of the present invention.

Example 11

<Electronic Equipment>

Figure 7:
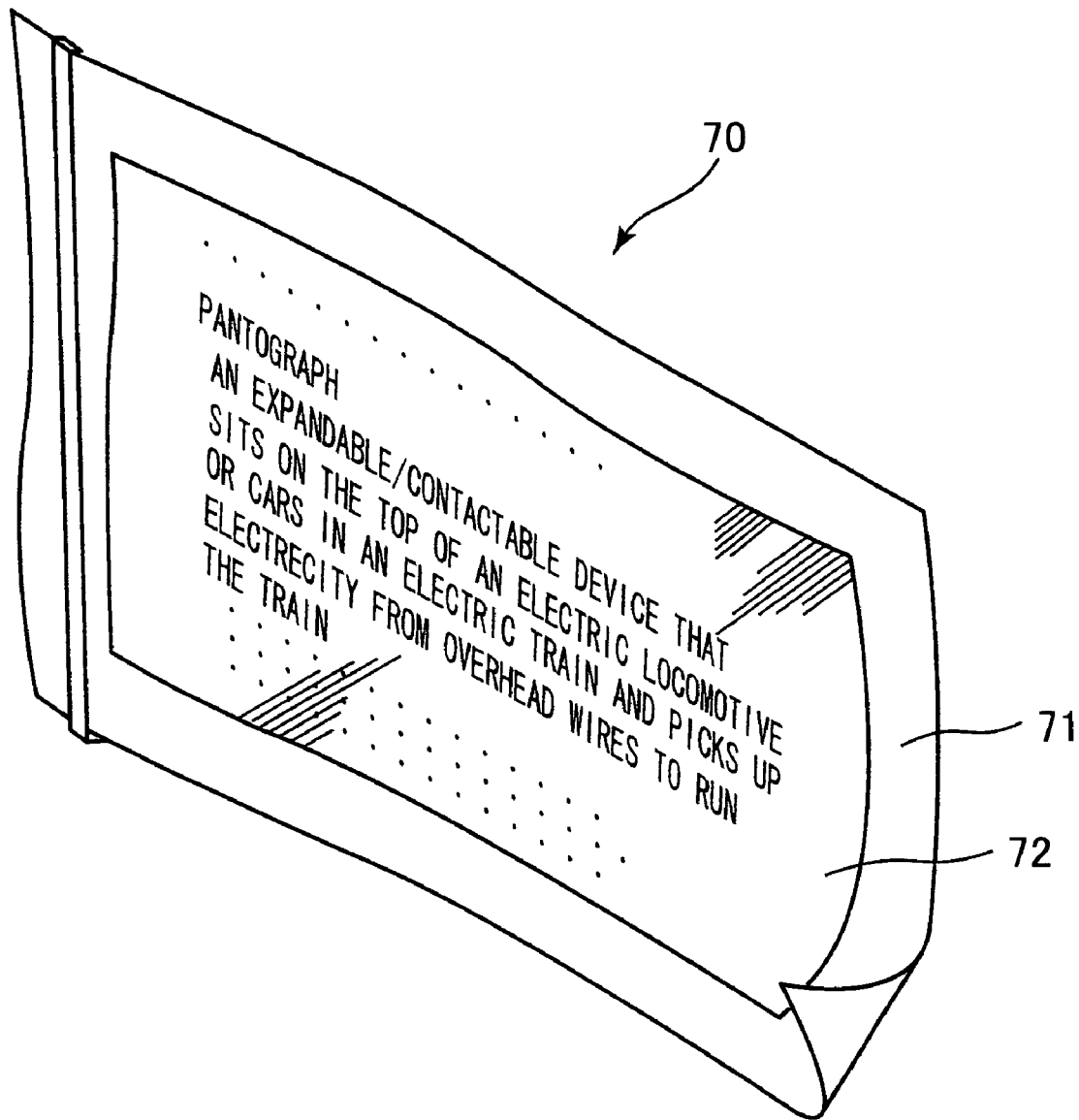
FIG. 7 is a perspective view showing one example of an electronic paper which is still another embodiment of the electronic equipment of the present invention.

FIG. 7 is a perspective view showing one example of an electronic paper which is still another embodiment of the electronic equipment of the present invention. Electronic paper 70 has body 71 formed of a re-writable sheet having the same texture and flexibility as those of a paper, and display unit 72. In the electronic paper 70, display unit 72 as a data displaying means is the electrophoretic display device of the present invention.

The IC card of Example 8, the mobile phone of Example 9, the electronic book of Example 10, and the electronic paper of Example 11 include the electrophoretic display device of the present invention as the data displaying means, so that they are electronic equipments having extremely excellent display properties such as display responsiveness and contrast.

The electrophoretic particle of the present invention can greatly improve display properties such as display responsiveness and contrast when used in an electrophoretic display device. The microcapsule for electrophoretic display and the sheet for electrophoretic display using such an electrophoretic particle make it possible to provide an electrophoretic display device and an electronic equipment having extremely excellent display properties. In addition, the process for producing an electrophoretic particle according to the present invention is preferred as a method of effectively obtaining such an electrophoretic particle. Therefore, the electrophoretic particle, the process for its production, and its use according to the present invention make a great contribution in the field relevant to electronic equipments comprising data displaying means, as a series of techniques providing data displaying means of extremely excellent display quality.

The invention claimed is:

1. An electrophoretic particle comprising:
   a pigment particle having an average particle diameter of 1 μm or smaller; and
   a polymer layer having an average thickness of 1 to 500 nm formed on a surface of the pigment particle, wherein 50% or higher of an entire surface of the pigment particle is coated with the polymer layer.

2. A process for producing an electrophoretic particle, comprising steps of:
   carrying out radical polymerization using a polymerization initiator in a state where a pigment particle and monomer components are present in a solvent to give an electrophoretic particle comprising a pigment particle and a polymer layer formed on a surface of the pigment particle, wherein:
   the pigment particle is a pigment particle having an average particle diameter of 1 μm or smaller which has been mixed with a coupling agent having a polymerizable reactive group prior to the radical polymerization;
   an amount of the coupling agent having a polymerizable reactive group to be used is 0.1% to 5% by weight, based on an amount of the pigment particle to be used;
   the solvent comprises a hydrophilic organic solvent and water, and a ratio of the water to be added is 10% to 30% by weight, based on a total amount of the solvent;
   the monomer components comprise a hydrophilic monomer and a hydrophobic monomer, and a ratio of the hydrophilic monomer to be added is 5% to 30% by weight, based on a total amount of the monomer components; and
   the polymerization initiator is water soluble, and a concentration of the monomer components is 0.5% to 5% by weight, based on a total amount of the solvent and the monomer components.

3. A dispersion for electrophoretic display, comprising a dispersing medium and an electrophoretic particle according to claim 1 dispersed in the dispersing medium.

4. A microcapsule for electrophoretic display, comprising a capsule shell and a dispersion for electrophoretic display according to claim 3 encapsulated in the capsule shell.

5. A sheet for electrophoretic display, comprising:
   a substrate sheet having a substrate film and an electrically conductive layer formed on the substrate film; and
   a layer containing microcapsules for electrophoretic display according to claim 4, the microcapsules-containing layer being formed on the electrically conductive layer of the substrate sheet.

6. An electrophoretic display device comprising a data displaying part, wherein the data displaying part comprises a sheet for electrophoretic display according to claim 5.

7. An electronic equipment comprising a data displaying means, wherein the data displaying means comprises an electrophoretic display device according to claim 6.

* * * * *